United States Patent [19]

Matsuoka et al.

[11] 4,328,540

[45] May 4, 1982

[54] DOOR OPERATION CONTROL APPARATUS

[75] Inventors: Shigeru Matsuoka; Toshio Tsubaki; Takeshi Tokunaga; Seiji Yonekura; Kenji Nakamura; Mituo Suzuki, all of Hitachi, Japan

[73] Assignee: Hitachi, Ltd., Tokyo, Japan

[21] Appl. No.: 123,086

[22] Filed: Feb. 20, 1980

[51] Int. Cl.$^3$ ........................ E05F 15/10; H02H 7/085

[52] U.S. Cl. .................................... 364/167; 364/513; 318/266; 318/469; 49/28

[58] Field of Search ........................ 364/425, 513, 107; 340/168 R; 318/466, 266, 281, 282, 286; 49/28, 26, 139

[56] References Cited

U.S. PATENT DOCUMENTS

| | | | |
|---|---|---|---|
| Re. 30,016 | 5/1979 | Hohn | 364/513 X |
| 3,178,627 | 4/1965 | Mouk | 318/266 |
| 3,539,894 | 11/1970 | Feldman | 318/469 X |
| 3,906,348 | 9/1975 | Willmott | 325/37 |
| 3,955,661 | 5/1976 | Popper et al. | 49/28 X |
| 3,996,697 | 12/1976 | Bailey et al. | 49/28 |
| 4,001,556 | 1/1977 | Folchi et al | 364/513 |
| 4,009,476 | 2/1977 | Lutz | 364/516 X |
| 4,106,593 | 8/1978 | Otto | 187/29 R |
| 4,107,877 | 8/1978 | Lee | 49/28 |
| 4,119,896 | 10/1978 | Estes et al. | 318/266 |
| 4,131,830 | 12/1978 | Lee et al. | 318/266 |
| 4,141,010 | 2/1979 | Umpleby et al. | 340/168 R X |
| 4,156,835 | 5/1979 | Whitney et al. | 364/513 X |
| 4,187,454 | 2/1980 | Ito et al. | 364/513 X |
| 4,204,255 | 5/1980 | Cremer | 364/425 |
| 4,231,191 | 11/1980 | Ellmore | 49/28 |

FOREIGN PATENT DOCUMENTS

| | | | |
|---|---|---|---|
| 2027793 | 2/1980 | United Kingdom | 49/28 |

*Primary Examiner*—Edward J. Wise

*Attorney, Agent, or Firm*—Craig & Antonelli

[57] ABSTRACT

A door operation control apparatus comprising a memory circuit for storing a programmed data on door control processes in the form of a combination of command codes is disclosed. A door operation input signal, a mode or condition detection signal from a door operating device and the condition of the program being executed are used to determine logically the optimum door operating mode, thus controlling the door operating device.

80 Claims, 37 Drawing Figures

DOOR OPERATION CONTROL APPARATUS

The present invention relates to a door operation control apparatus or more in particular to a door operation control apparatus suitable for controlling a garage door operating device.

Prior art devices for operating a garage door by using a motor drive have been suggested. This motor is connected to a power supply via a relay circuit controlled by a radio control command switch or a command push button switch, thus driving the door in a predetermined direction. Such control apparatuses for a motor-driven door are disclosed in U.S. Pat. No. 3,178,627 invented by Richard D. Houk and patented Apr. 13, 1965 or U.S. Pat. No. 3,906,348 invented by Colin B. Willmott and patented Sept. 16, 1975. In these prior art door operation control apparatuses, the conditions for door operation control are set mechanically, thereby leading to the disadvantages that they cannot meet a multiplicity of door operating conditions or they require a complicated relay circuit in order to meet a multiplicity of control conditions. Another disadvantage of these prior art control apparatuses is that when control apparatus designed for a specific door is to be used for another form of door, the control apparatuses are required to be changed in design in many points.

Accordingly, it is an object of the present invention to provide a door operation control apparatus which meets a multiplicity of control conditions and is versatile in its use at the same time.

According to the present invention, there is provided a door operation control apparatus comprising a program memory circuit for storing programmed data on the conditions for door control as a combination of command codes, means for detecting the modes or conditions of the door operating device, door operation command means, and an operational processing circuit, wherein the command codes are sequentially read out from the program memory circuit, so that a door condition detection signal, a door operation command signal and the program being executed are logically judged, thereby sequentially controlling the door operating device.

The above and other objects, features and advantages will be made apparent by the detailed description taken in conjunction with the accompanying drawings, in which.

Figure 1:
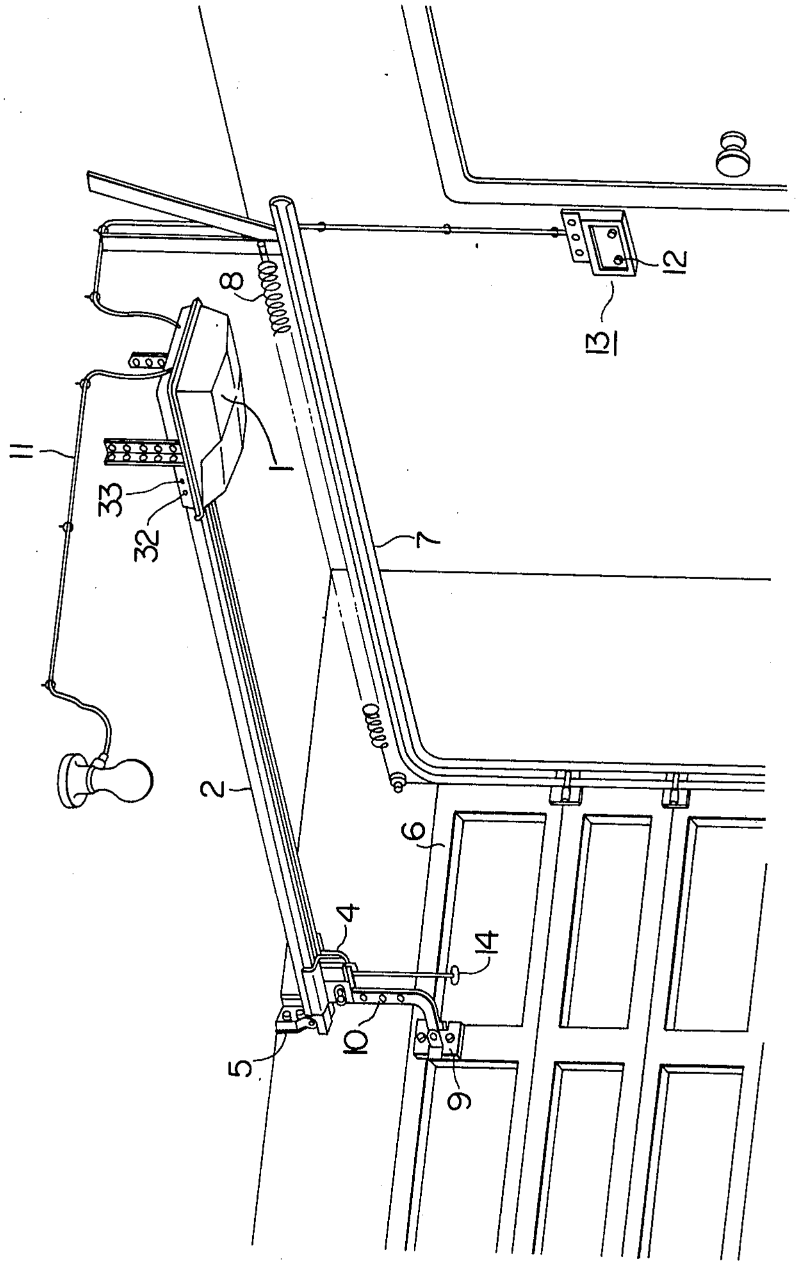
FIG. 1 is a perspective view of a door operating apparatus.

As shown in FIG. 1, a garage door operating device for which a control apparatus according to the present invention is used comprises essential parts including a body 1 housing a driving mechanism, a rail 2 coupled with the body 1, and a trolley 4 guided by the rail 2 and adapted to be horizontally moved, the trolley 4 being secured to a roller chain actuated by the driving force of the body 1. The body 1 is hung from the ceiling of the garage by a hanger, and an end of the rail 2 is secured to part of the garage by a header bracket 5. A garage door 6, on the other hand, is generally divided into several parts coupled to each other and is opened and closed along door rail 7 on both sides thereof. The weight of the garage door 6 is balanced with a door balance spring 8 and is capable of being operated manually. A door bracket 9 is secured to the garage door 6. The door bracket 9 is rotatably coupled to the trolley 4 through a door arm 10. Thus the garage door 6 is closed or opened along the door rail 7 in an interlocked relation with the roller chain 3 actuated by the driving force of the body 1 and the trolley 4 horizontally moved along the rail 2 by actuation of the roller chain 3. Power is supplied to the body 1 through a power cable 11.

A command for operating the body 1 is issued to the body 1 by depressing a push button switch 12 mounted on the wall of the garage or from a control 13 housing a receiver for receiving a signal in the form of electric wave or the like. Should the garage door operating device be rendered inoperative by a power failure or a like accident, a releasing string 14 decouples the roller chain 3 and the trolley 4, thus making the garage door 6 ready for manual operation.

Figure 2:
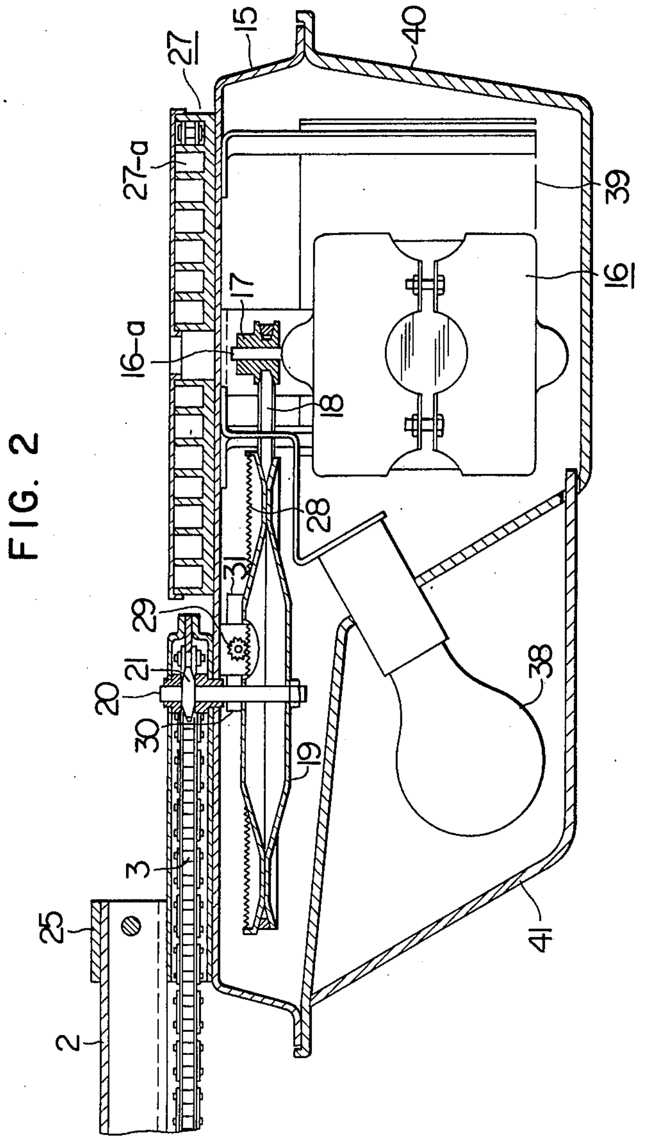
FIG. 2 is a longitudinal sectional view of the body of the door operating device.
Figure 3:
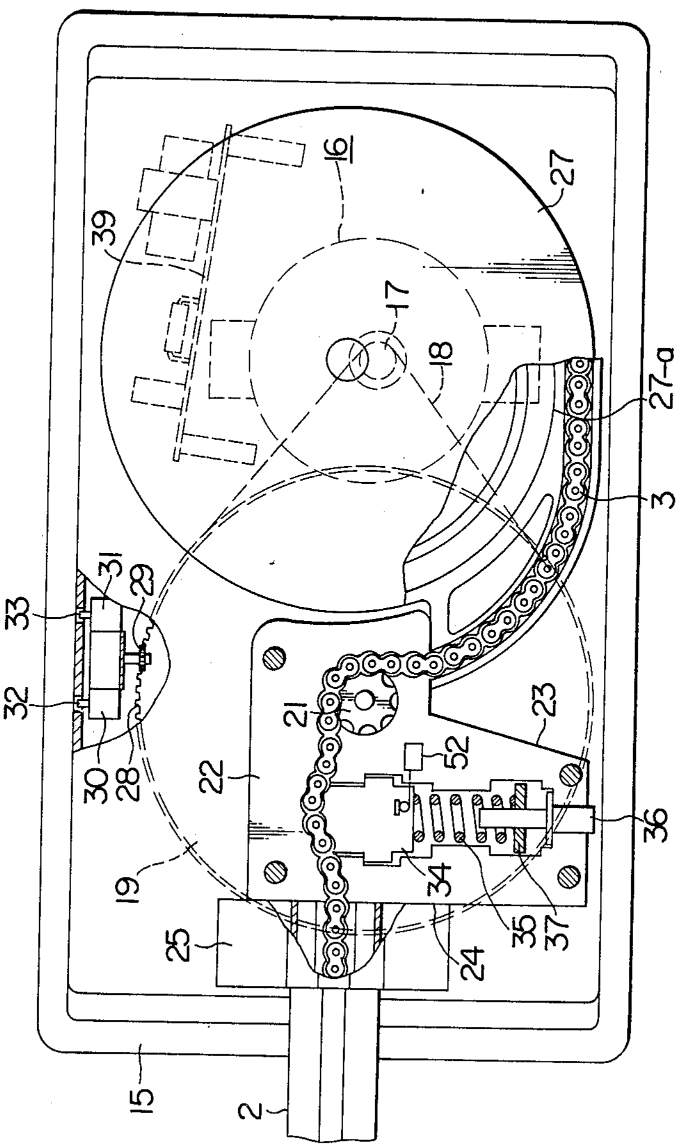
FIG. 3 is a partially cut-away plan view of the door operating device.

The construction of the body 1 of the garage door operating device will be explained with reference to FIGS. 2 and 3. FIG. 2 is a longitudinal sectional view and FIG. 3 a partially cut-away top plan view of the body 1. The turning effort of a motor 16 secured to the lower side of the body frame 15 is transmitted to a motor pulley 17 secured to a motor shaft 16-*a*, a V-belt 18 and a large pulley 19. Further, the turning effort of the large pulley 19 is transmitted to a sprocket 21 through a sprocket shaft 20.

The sprocket 21 is engaged with the roller chain 3. The rollers of the roller chain 3 are guided by a chain guide (A) 22, a chain guide (B) 23 and a chain guide (C) 24 from both sides thereof within the body 15. The rail 2 is secured to the frame 15 by a rail securing metal 25 without any difference in level or a gap with a groove formed by the chain guide (A) 22 and the chain guide (C) 24. The rollers of the roller chain 3 are guided on both sides thereof by the rail 2.

The roller chain 3 taken up by the sprocket 21 is contained in a chain containing groove 27-*a* of a chain containing case 27 secured without any difference in level or a gap with the groove formed by the chain guide (A) 22 and the chain guide (B) 23.

In this construction, the rotation of the motor 16 rotates the sprocket 21, so that the roller chain 3 is reciprocated along the rail 2.

Next, a limit mechanism for limiting the horizontal movement of the trolley 4, i.e., the upper and lower limits of the operation of the garage door 6 explained with reference to FIG. 1 will be described. The amount of movement of the roller chain 3 is converted into the amount of movement of a pulley rack 28 provided on the outer periphery of the large pulley 19 rotated at the same rotational speed as the sprocket 21. The amount of movement of the pulley rack 28 is transmitted to an upper limit switch 30 and a lower limit switch 31 through a pinion 29 in mesh with the pulley rack 28.

The upper limit switch 30 and the lower limit switch 31 have an upper limit adjusting knob 32 and a lower limit adjusting knob 33 respectively whereby the upper limit point and the lower limit point are freely adjustable from outside of the body.

In the case where the garage door encounters an obstruction during the downward motion thereof, it must be immediately detected and the door operation is required to be reversed, i.e., it must be moved upward for safety's sake. If the garage door strikes an obstruction during the upward motion thereof, on the other hand, it must be detected and the door must be stopped immediately for safety's sake. The above-mentioned obstruction detecting mechanism will be described below.

Part of the chain guide groove formed by the chain guide (A) 22, the chain guide (B) 23 and the chain guide (C) 24 is curved. An obstruction detecting device 34 is provided which is driven by the compressive force applied to the roller chain by the downward door motion or the tensile force applied to the roller chain 3 by the upward door motion. The compressive force of the obstruction detecting spring 35 for limiting the operation of the obstruction detecting device 34 is capable of being freely changed by moving the spring holding plate 37 by turning the obstruction-exerted force adjusting screw 36. Also, by the operation of the obstruction detecting switch 52 which is turned on and off in response to the movement of the obstruction detecting device 34, such an obstruction as mentioned above is detected, so that the door is reversed into upward motion from downward motion, whereas it is stopped if it is in upward motion.

A lamp 38 is for illuminating the inside of the garage, which lamp 38 is adapted to be turned on or off in response to the movement of the garage door. Further, a controller 39 for controlling the motor 16 and the lamp 38 is secured within the frame 15. A body cover 40 and a lamp cover 41 cover the motor 16, the large pulley 19 and the lamp 38. The lamp cover 41 is translucent and allows the light of the lamp 38 to pass therethrough, thus brightly illuminating the inside of the garage. The foregoing is the description of the construction of the body of the garage door operating device. Next, the rail and the trolley will be explained below with reference to FIGS. 4 and 5.

Figure 4:
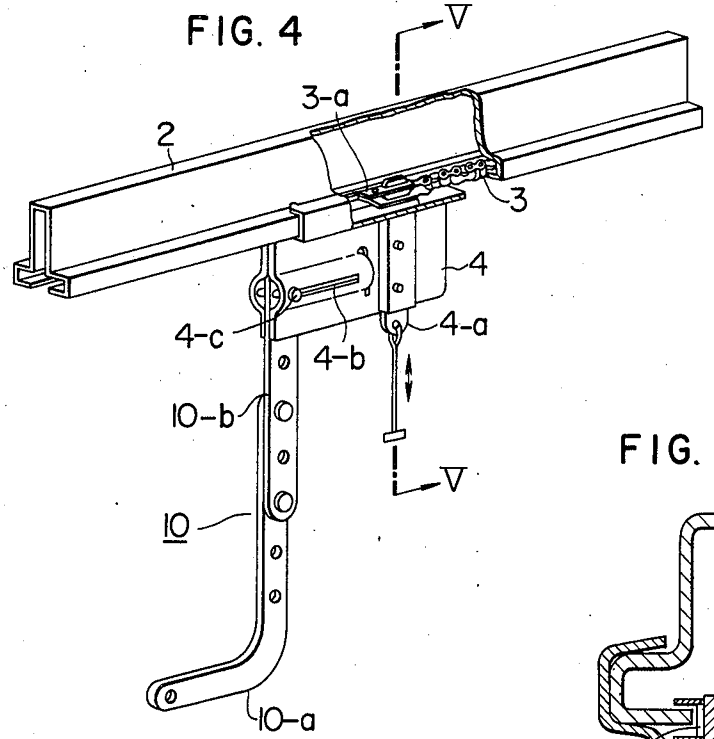
FIG. 4 is a partially cut-away view showing the condition in which a rail and a trolley are coupled to each other.
Figure 5:
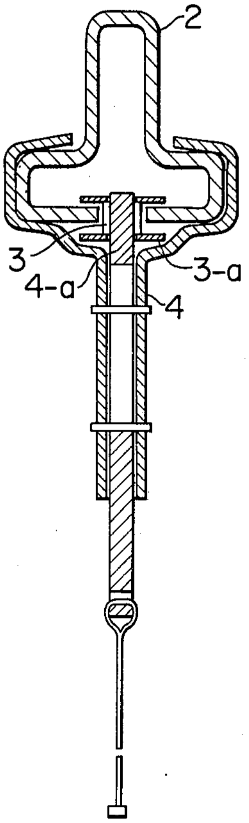
FIG. 5 is a sectional view taken in the line V—V in FIG. 4.

The rail 2 is formed of a thin iron plate or a plastic plate and is used to slidably guide the trolley 4 along the outer periphery thereof. The rail 2 holds the rollers of the roller chain 3 from both sides thereof thereby to reciprocate the roller chain 3 in a straight line. The trolley 4 and the roller chain 3 are coupled to each other in such a way that a connecting metal 4-*a* is inserted into a slot formed in the roller chain attachment 3-*a* secured to the end of the roller chain 3 and guided in the same manner as the roller chain 3. The connecting metal 4-*a* is slidable within the trolley 4 and is normally held up by the force of a spring or the like, thus coupling the trolley 4 with the roller chain 3. In the event of a power failure or other accident when the door is required to be operated by human power by separating the garage door operating device from the door, the connecting metal 4-*a* is pulled down and separated from the roller chain attachment 3-*a*. The door arm 10 for transmitting the operation of the trolley 4 is comprised of an L-shaped door arm portion 10-*a* and a straight door arm portion 10-*b* which are coupled with the length thereof determined freely depending on the positional relation between the door and the rail. An end of the door arm 10 is connected to the trolley 4, and the other end thereof is connected to the door 6 through the door bracket 9 shown in FIG. 1. The door arm 10 and the trolley 4 are connected with each other in such a manner that a pin 4-*c* is inserted into the slot 4-*b* of the trolley 4. The pin 4-*c* is normally kept pressed as shown in FIG. 4. This is for the purpose of absorbing the shock which will occur if the door collides with an obstruction while moving down and also provides for a soft landing of the door during normal downward operation as the door reaches the floor.

Further, some action must be taken to prevent the reversing of the door downward movement by erroneous obstruction detection in the presence of a small item such as a water hose or the raising of the floor surface by snow, ice or the like. Specifically, up to the height of two inches from the floor surface, it is necessary that the door movement be not reversed but stopped by detection of an obstruction. In this case, the difference of the amount of movement between the trolley 4 and the door 6 is compensated by a control arrangement which will be described more fully hereinafter.

An embodiment of the present invention will be described below with reference to FIGS. 6 to 37.

Figure 6:
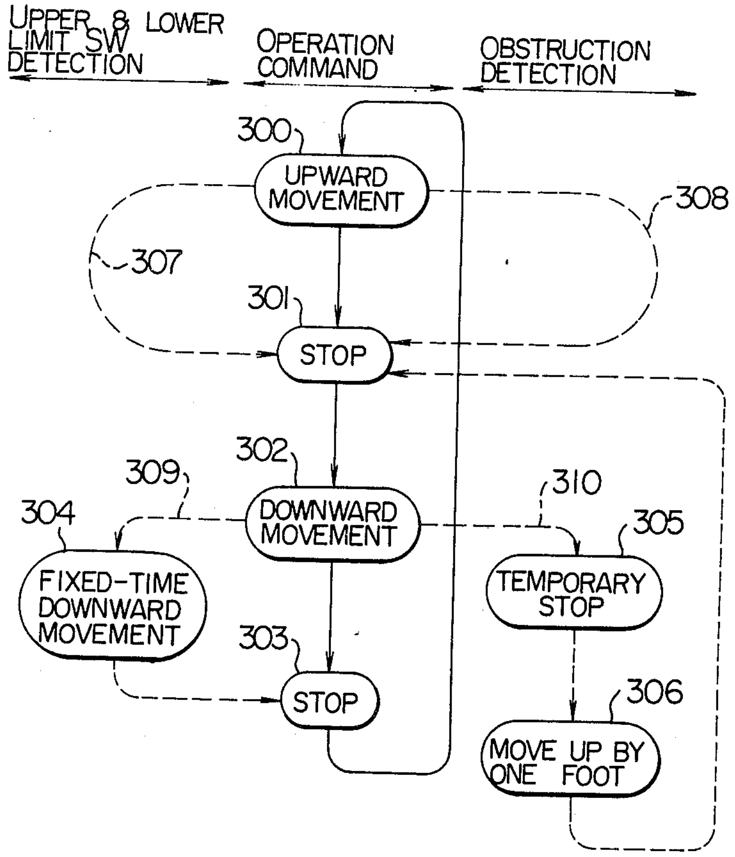
FIG. 6 is a flow chart showing the fundamental operation.

The diagram of FIG. 6 shows a flow chart illustrating the sequence of the fundamental operations of the garage door. In FIG. 6, after power is thrown in, the garage door 6 is in the stationary state 303. In response to each operation command, the garage door 6 repeats the processes including the upward movement 300, stationary state 301, downward movement 302 and stationary state 303 in that order. Apart from these operating commands, the door 6 promptly tranfers to the stationary state 301 through the state 307 when an input is applied from the upper limit switch 30 in response to the garage door 6 in the upward movement mode 300. When an input signal is applied from the lower limit switch 31 in response to the garage door 6 in downward movement 302, by contrast, the door 6 transfers to the fixed-time downward movement 304 through the state 309, and after the fixed time, it enters the stationary state 303. The reason for which the door moves down for the fixed time length will be explained later in detail.

Now, explanation will be made about the action to be taken when the movement of the garage door 6 is stopped to secure the safety thereof. In the case where an obstruction detection signal is applied while the garage door 6 is moving up, it promptly enters the stationary state 301 through the state 308. In the presence of an obstruction detection input during the downward movement of the garage door 6, on the other hand, the door transfers to the temporary stationary state 305 through the state 310, and after a fixed time length, transfers to the state 306 one foot higher. This one-foot rise is time controlled, so that after a predetermined length of time, the door transfers to the stationary state 301. Assuming that an input signal is applied from the upper limit switch 30 while the door is moving upward by one foot as mentioned above, however, the input from the upper limit switch 30 is given priority, so that the door 6 immediately transfers to the stationary state 301.

The reason for the downward movement for the fixed time length described above will be explained below. Generally, in winter season, the floor level under the door is liable to change due to the freezing or snowfall. If the floor level changes and rises from the initially-set level for the reasons mentioned above, the door moving down will always actuate the obstruction detection switch 52 and transfer to the state 310, thus making it impossible to close the door. For this reason, according to this embodiment, the lower limit switch 31 is actuated before the door 6 is closed up completely, so that the door is closed up after further downward movement for a predetermined length of time. In the presence of an input from the lower limit switch 31, a stop signal is produced when the obstruction detection input is received prior to expiration of the fixed length of time. By doing so, proper door operation is not affected by any change in the floor level under the door. Further, this embodiment facilitates adjustment of the lower limit because it fully satisfied the provisions of U.S. Standards UL-325.27.1, thus remarkably improving the door operating efficiency.

More specifically, adjustment is made to actuate the lower limit switch 31 at the height of 2 inches from the floor level, so that the door 6 is completely closed up after the downward movement 304 for the fixed length of time. If the obstruction detection switch 304 is turned on during the fixe-time downward movement 304, action against the obstruction is given priority, so that the door 6 rapidly transfers to the stationary state 303. In this way, the pressing force against an obstruction present within two inches from the floor level is reduced.

The processes for controlling the garage door according to the present invention as mentioned above will be explained more in detail later with reference to the flow charts of FIGS. 14 to 37.

Figure 7:
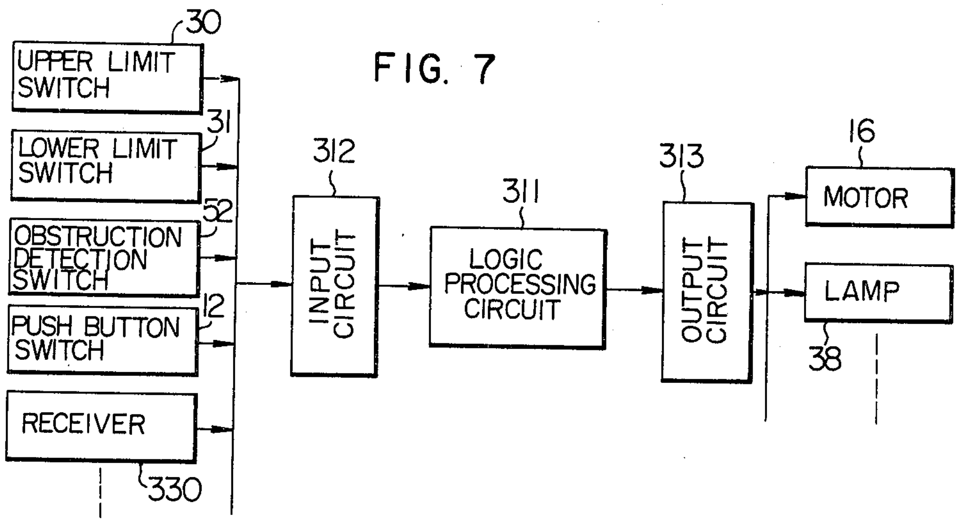
FIG. 7 is a basic block diagram showing a control section.

A basic block diagram of the control section is shown in FIG. 7. The control section basically comprises an input circuit 312, a logic processing circuit 311, and an output circuit 313. The input circuit 312 is an interface circuit having what is generally called a signal level conversion function, which circuit is impressed with signals representing the conditions of the garage door 6, from the upper limit switch 30, the lower limit switch 31, the obstruction detection switch 52 and a signal for operating the garage door 6 from the push button switch 12 or the receiver 330 for radio control. These signals are processed in optimum manner according to the processing steps stored in advance, and the resulting output is produced. This output signal is amplified by the output circuit 313, thereby subjecting the motor 16 to forward-reverse control and the in-garage illumination lamp 38 to on-off control.

Figure 8:
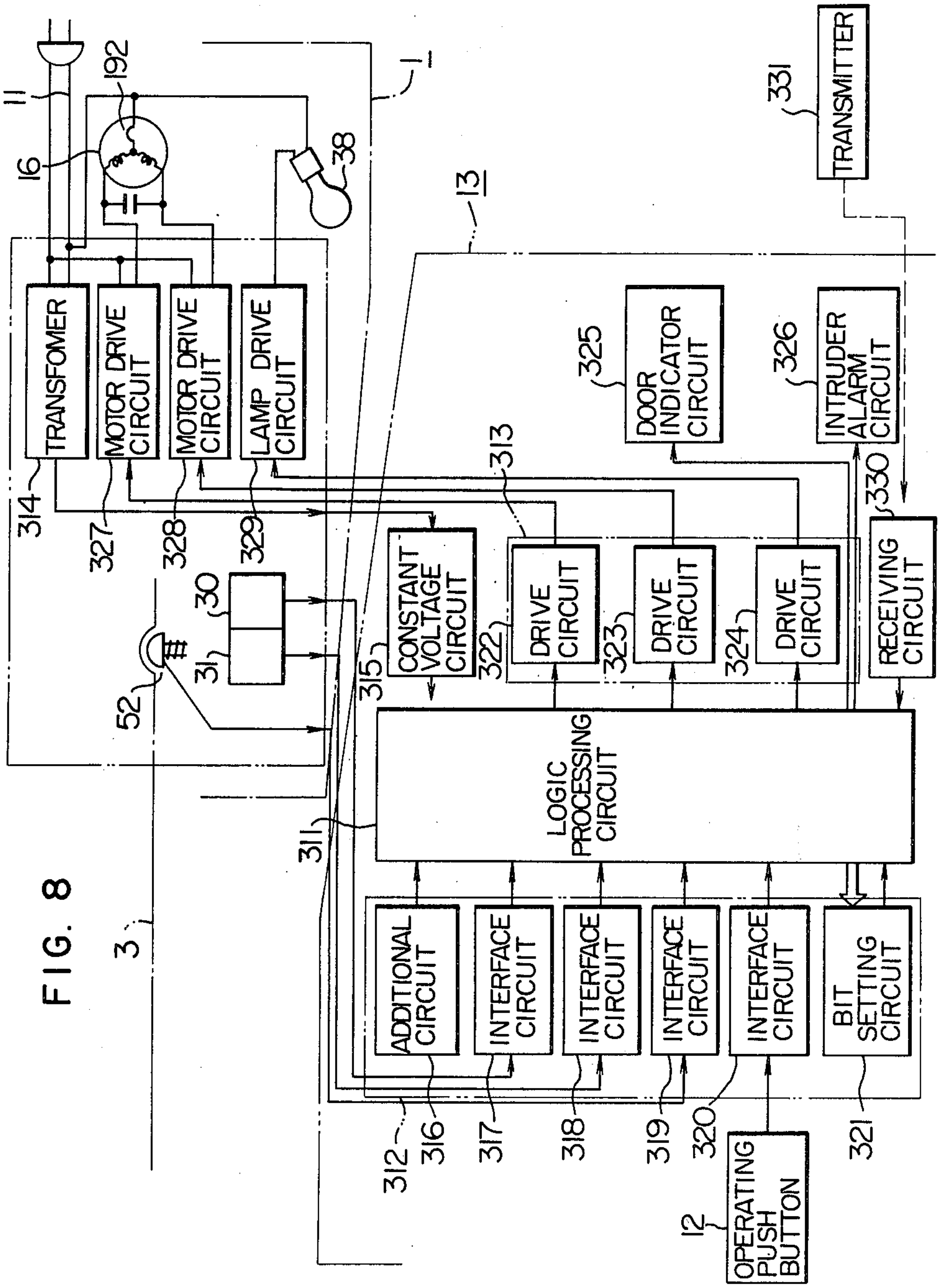
FIG. 8 is a block diagram showing the same control section in detail.

An embodiment representing the basic block diagram of FIG. 7 is shown in FIG. 8.

According to the present embodiment, the control device 13 containing the receiver also contains all the signal processing parts primarily including the logic processing circuit 311. The body 1 includes a driving section and an illuminating section comprised of the motor 16 and the lamp 38 respectively, and a driver circuit for driving them, or more specifically, motor drive circuits 327, 328 comprised of a relay and a transformer 314, and a lamp drive circuit 329 comprised of a relay. The control device 13 is connected to the body 1 by way of eight wires. The primary source voltage supplied by the power cord 11 is reduced to AC 14 V by the transformer 314, and converted into a constant voltage to DC 10 V by the constant voltage circuit 315. The outputs of the upper limit switch 30, the lower limit switch 31 and the obstruction detection switch 52 are applied to the interface circuits 317, 318 and 319 including resistors and capacitors, the outputs of which are in turn applied to the logic processing circuit 311 respectively.

The output signal from the operating push button switch 12 is applied to the interface circuit 320 including a resistor and a capacitor, the output of which is applied to the logic processing circuit 311. The output of the logic processing circuit 311 is applied to the drive circuit 322 including a transistor, thereby driving the drive circuit 327 including a relay for driving the motor 16 forwardly. The drive circuit 322 including a transistor, in turn, is impressed with the output of the logic processing circuit 311, thereby driving the drive circuit 328 including a relay for reversely driving the motor 16. As a drive circuit for turning on and off the lamp 38, the drive circuit 329 including a relay is driven by the logic processing circuit 311 through the drive circuit 324 including a transistor for driving the relay of the drive circuit 329.

A door indicator circuit 325 for indicating the conditions of the garage door 6 and an intruder preventing alarm circuit 326 which are included in the output circuits of the logic processing circuit 311 will be explained in detail later.

The push button switch 12 is a door operating switch mounted on the case of the control device 13, apart from which there is provided a radio control operating command system utilizing the transmission-receiving functions. This is for operating the door from a position distant from the garage and used an electric wave of UHF band. For operation, first, the bit setting section contained in the transmitter 331 and the bit setting circuit 321 within the control device 13 are set appropriately. The data supplied sequentially from the transmitter 331 include bit data thus set. The format of the data will be explained later in detail. The data thus supplied are modulated and converted into a binary number signal at the receiving circuit 330 and applied to the logic processing circuit 311. The receiving circuit used in this case mainly comprises a super-regeneration circuit. The date supplied are compared with the data stored in the bit setting circuit 321 sequentially, and only when all the bits are coincident, they are processed as an operating signal. Naturally, if bits are set improperly, the garage door is incapable of being operated.

In addition, there is provided an additional circuit 316 having the function to set the on time of the lamp 38.

Figure 9:
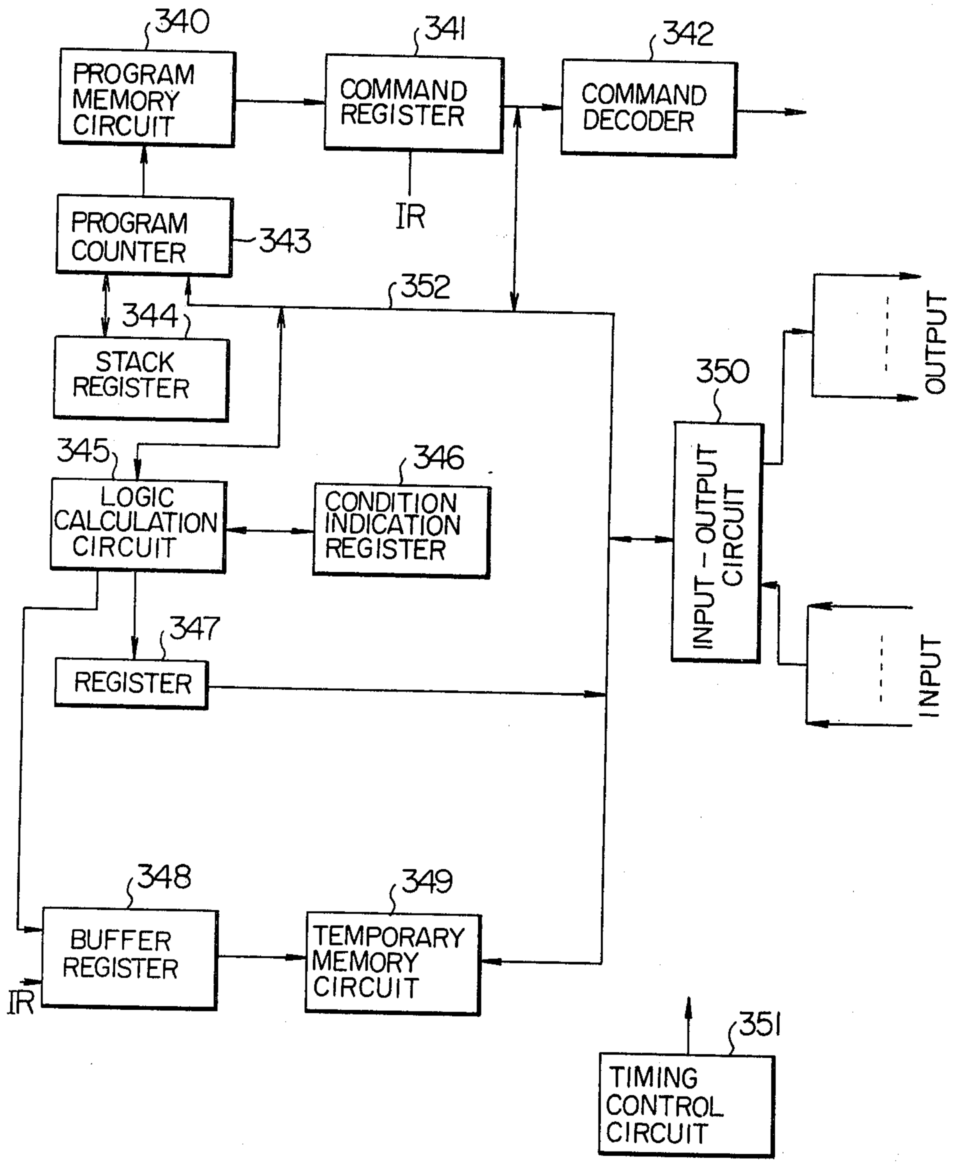
FIG. 9 is a diagram showing a logic processing circuit.

Next, the configuration of the logic processing circuit 311 will be explained with reference to FIG. 9. In order to control the garage door in optimum manner, the circuit 311 comprises a program memory circuit 340

(which in this case is a read-only memory (ROM)) for storing programmed data on the processing sequence in advance, a command register 341 for temporarily storing a command code read out of the program memory circuit 340, and a command decoder 342 for decoding the command code stored in the command register 341. The entire circuits are operated in response to a timing pulse produced from the timing control circuit 351 for controlling the operation timing of the entire circuits and the command code. A program counter 343 is provided for designating and updating an address of the command code for the program memory circuit 340. The program counter 343 is connected with a stack register 344 used for storing the return address in the case of a skip such as a subroutine jump.

Further, the circuit 311 comprises a logic calculation circuit 345 for logic operation, a condition indication register 346 for temporarily storing the result of the logic calculation, a register 347 such as an accumulator used for logic calculation, and temporary memory circuit 349 (which employs a random access memory (RAM)) for storing the result of logic operation or a status flag such as the present condition of the garage door ("1" in operation, and "0" in stoppage). A buffer register 348 is addressed by the logic calculation circuit 345, and the main circuits are connected by a bus line 352. The bus line 352 is also connected with the input-output circuit 350, so that the input-output condition applied through the bus line 352 is processed by logic decision means including the logic calculation circuit 345, the register 347 and the condition indication register 346.

Figure 10:
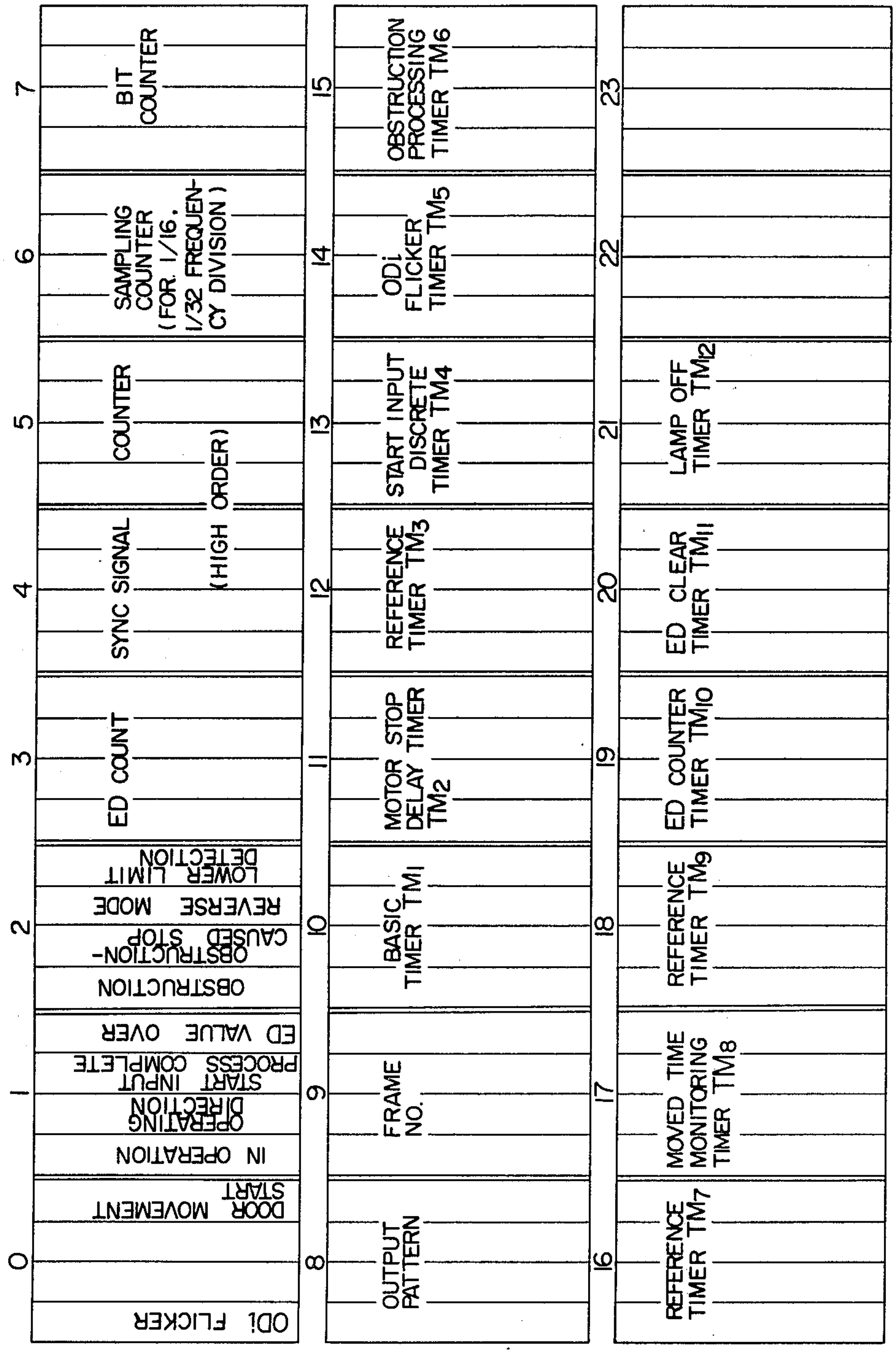
FIG. 10 shows a memory pattern for a temporary memory circuit.

The temporary memory circuit 349 which plays an especially important role in the above-mentioned processing in this circuit configuration will be described below with reference to FIG. 10.

As explained above, the temporary memory circuit 349 is used for temporary storage of the result of calculation or condition flags. The embodiment under consideration has a map area of 22 words. These condition flags are assigned with three words of 0, 1 and 2. The individual flags will be defined later with reference to the attached flow charts.

The 12 words from 10 to 21 are used as timer elements. A basic timer $TM_1$ makes up the essence of all the timers, which timer operates at 15.625 msec in this embodiment. This figure is obtained by counting a predetermined number of steps in view of the fact that the time required for the processing step for each program is known in advance. In other words, the embodiment under consideration of this invention uses no timer system which is comprised of external hardware.

These condition flags and timers are updated sequentially in accordance with their processing steps, so that the resulting data and the command codes stored in the program memory circuit are used for logic decision at the logic calculation circuit 345, thus determining an optimum program processing.

Next, the sequence of operation of the garage door according to the present invention will be explained specifically.

The operation sequence of the garage door is already explained with reference to FIG. 6. Before referring to the flow charts, items to which special attention shall be paid will be described in connection with the date to be processed.

(1) Discrete input signal control

This is for discrimination whether the input signal from the operating push button switch or the receiver is a new signal or a continued signal. As one method for this discrimination, the timer $TM_4$ is set after the input signal is turned off, so that if an input signal is applied anew before the time over, it is determined as a continued signal, while if the next signal is applied after the time over, it is processed as a new input signal. In the case of the signal applied before time over, the timer $TM_4$ is set anew after that signal is turned off. Further, the embodiment of the present invention under consideration has the following additional features to improve the operating efficiency thereof:

(1) When the door begins to operate, a condition where it is desired to stop the door may occur, such as when an obstruction is present in the way of the door. To meet such a situation, the value of 0.25 seconds is employed for the discrete timer $TM_4$ for the door in operation.

(2) When restarting the door after it has stopped, it is necessary to provide a sufficient length of door stoppage time in order to reduce any great shock load which otherwise might be exerted on the driving section or the door. Our experiments confirmed that the rotational inertia of the motor completely disappears within about 0.15 seconds, and as a result the value of 0.5 seconds is employed for the discrete timer $TM_4$ in stationary state.

(2) Number-of-starts control

Figure 11:
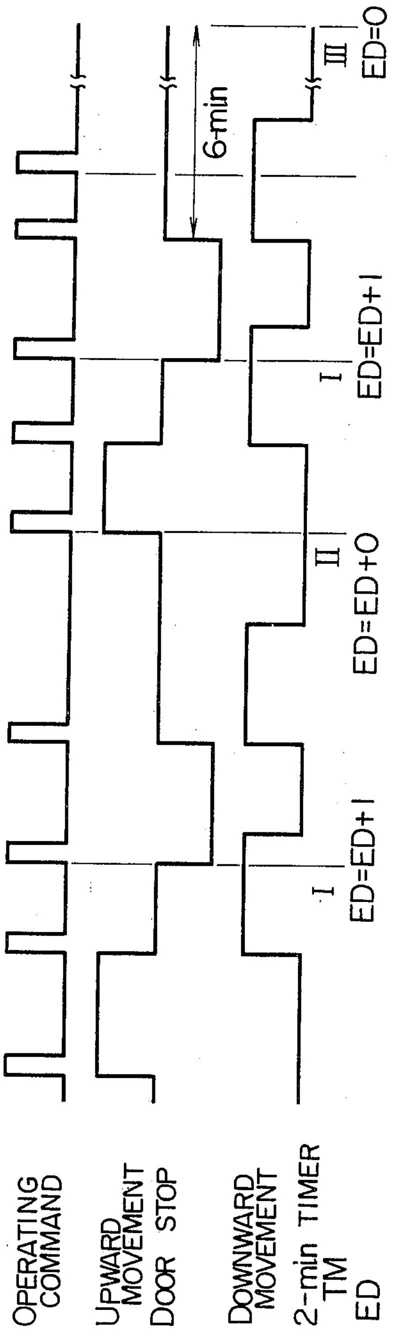
FIG. 11 is a time chart for controlling the number of actuations.

The motor used for the garage door is generally rated for a short time, and if it is operated continuously in repetitive fashion, the thermal switch 192 for the motor is actuated. As a result, unless the motor housing is cooled, the thermal switch 192 is not restored, thus rendering the garage door inoperative for about 20 minutes. Such a situation is not likely to occur under normal operating conditions but may be caused by mischief of children in most cases. Especially when children's mischief causes very frequent actuations of the thermal switch 192, the motor life is shortened undesirably on the one hand and a serious accident may occur on the other hand. As one method for preventing such an unfavorable situation, a number-of-starts control algorism as shown in FIG. 11 is employed in this embodiment.

(1) The timer $TM_{10}$ is set at 2 minutes after the door has stopped.

(2) If a restart operating command is applied before time over of the timer $TM_{10}$ such as in condition I, the ED counter i.e., the number-of-starts counter is stepped forward.

(3) In the event that a restart operating command is applied after time over of the timer $TM_{10}$ such as in the condition II, the ED counter is kept in the same state.

(4) If a restart operating command fails to be applied within six minutes following door stoppage such as in the condition III, the ED counter is cleared. The timer $TM_{11}$ is used for this purpose.

(5) If the ED counter reaches the value 12 after the processes (2), (3) and (4) above, any operating command is rejected for subsequent six minutes. Thus the door is rendered operable again six minutes after.

(3) Open door indicator (hereinafter sometimes referred to as ODi)

Figure 12:
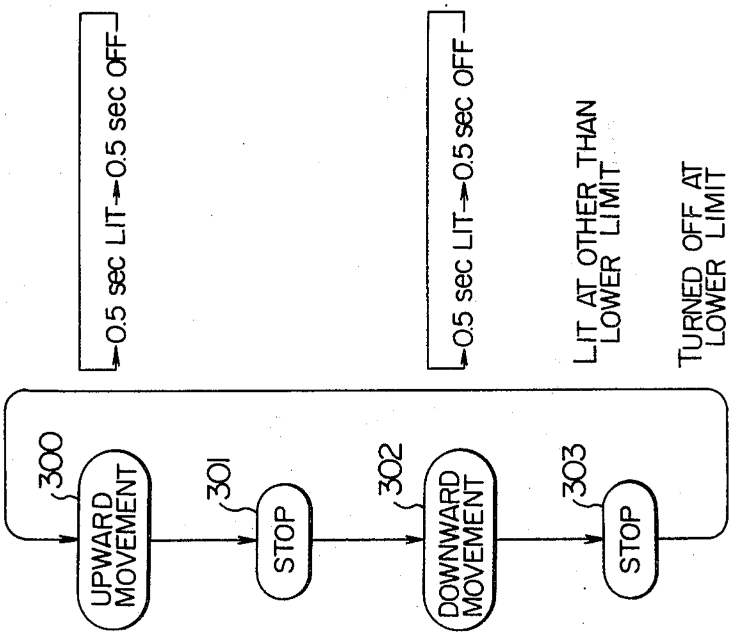
FIG. 12 is a flow chart for a door indicator.

This is for indicating the condition of the garage door shown in FIG. 1 and comprises such specific elements as a lamp and a door indicator circuit 325 for turning on and off a light-emitting diode. An example of the light-emitting diode turned on and off is shown in FIG. 12.

(4) Double safety control

In the case where the upper limit switch 30 or the lower limit switch 31 for setting the door motion range gets out of order, the door runs against the floor if going down or runs against the upper stopper if going up, thus actuating the obstruction switch 52. If the obstruction switch 52 is out of order, however, the door continues to be pressed against the obstruction strongly until the motor generates a lock torque and turns on the thermal switch 192. This condition is not desirable for safety and must be prevented in the manner mentioned below. In view of the fact that the distance covered by the door is limited to, say, 9 feet or 2.7 m, the time required for coverage is naturally limited. For instance, if the door runs at the speed of 10 m/min., the time required $T_T$ is 16 seconds (2.7 divided by 10, and the resulting minutes converted into seconds). In the event that with the timer $TM_8$ set after starting the operation of the door, the upper limit, lower limit or obstruction signal fails to be applied before time over of the timer $TM_8$, the condition is judged as abnormal and the obstruction detecting processing function is performed. This function is effective to secure safety in that the motor is stopped within a predetermined time in the case where, for instance, the door fails to operate due to a fault of part of the driving system or specifically, the turning effort is not transmitted due to a belt slip which heats the belt and the belt is liable to be broken.

(5) Obstruction ignoring control

Generally, the friction is divided into static and dynamic frictions, the former being greater than the latter. This is also the case with the door garage. At the time of starting the operation of the garage door, for instance, a great force is required, although during the door operation, so great a power is not required. In order for the obstruction detection switch 52 to fail to be actuated at the time of door operation start, an operation setting value must be made great, with the result that the ability to detect an obstruction against the door in operation represents a great value. This contradicts the small power for obstruction detection which is required for high door operating efficiency and safety. To overcome this problem, this embodiment of the invention is such that the obstruction detection is ignored for a predetermined length of time, or one second in this case after starting the door operation. This is based on the assumption that every door remains in adequately steady operation at least for one second after start.

(6) Upper-lower limit switch control

It is normally impossible that the upper limit switch and the lower limit switch are actuated at the same time. In abnormal cases, however, such a condition may occur. The contacts of the upper limit switch 30 may be in fusion-closed when the lower limit switch 31 is on as the door is at the lowest position, or part of the wiring may be broken and come into contact with the chassis. By contrast, when the door is at the uppermost position and the upper limit switch 30 is on, the contacts of the lower limit switch 31 may be closed by fusion or part of the wiring may be broken and in contact with the chassis. In still another case, the wiring may be broken or the contacts may be broken for both the upper and lower limit switches at the same time. In such a case, the door is kept stationary in spite of application of an operating input signal or regardless of the simultaneous application of the limit switch signals.

(7) Lamp-lit time control

The additional circuit 316 shown in FIG. 8 is adapted to set the lamp-lit time at two or six minutes. According to the embodiment of the invention under consideration, the lamp is lit upon starting the door operation, and after the door has stopped, the timer $TM_{12}$ is set as predetermined, so that the lamp may be extinguished by time over of the same timer $TM_{12}$.

(8) Received signal control

Figure 13:
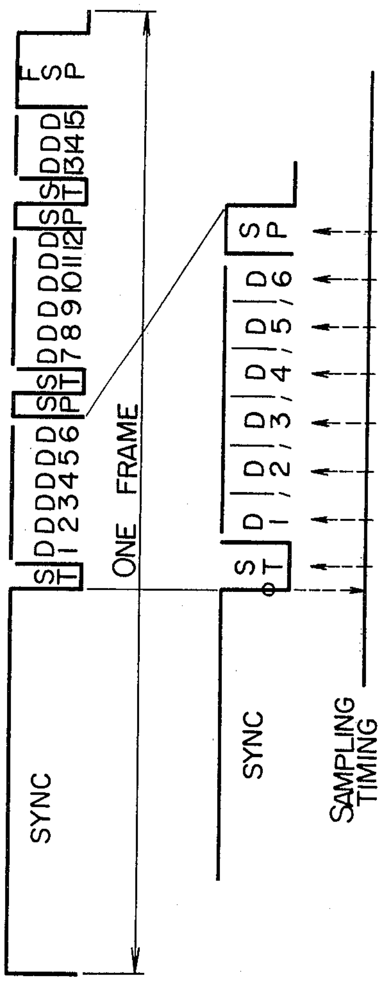
FIG. 13 shows a transmission-receiving data format.

The signal transmitted from a radio control transmitter is demodulated into a binary number by the receiving circuit 330 and applied to the logic processing circuit 311. A format of such an input signal is shown in FIG. 13. For the purpose of classification in the communications field, this format belongs to NRZ (Non return zero) the specification of which will be described below.

(1) The synchronizing signal SYNC has 16 bits. The length of this synchronizing signal SYNC is counted, and if it is within a predetermined range, the signal is processed as a synchronizing signal. First, the length of the synchronizing signal is taken as 1/16, and thus a sampling period is determined.

(2) The sampling is started from the fall of the synchronizing signal SYNC. Only for the start bit ST, however, the sampling length is set at 1/32. The start bit is kept always "0".

(3) After sampling check of the data of 6 bits, it is confirmed that the stop bit SP is "1". From the fall of this stop bit SP, the next sampling is started. By doing so, the sampling error accumulation can be retained in eight bits.

(4) After completion of the checking "1110" of the frame stop bit FSP, the signal is processed as an operating signal.

Figure 14:
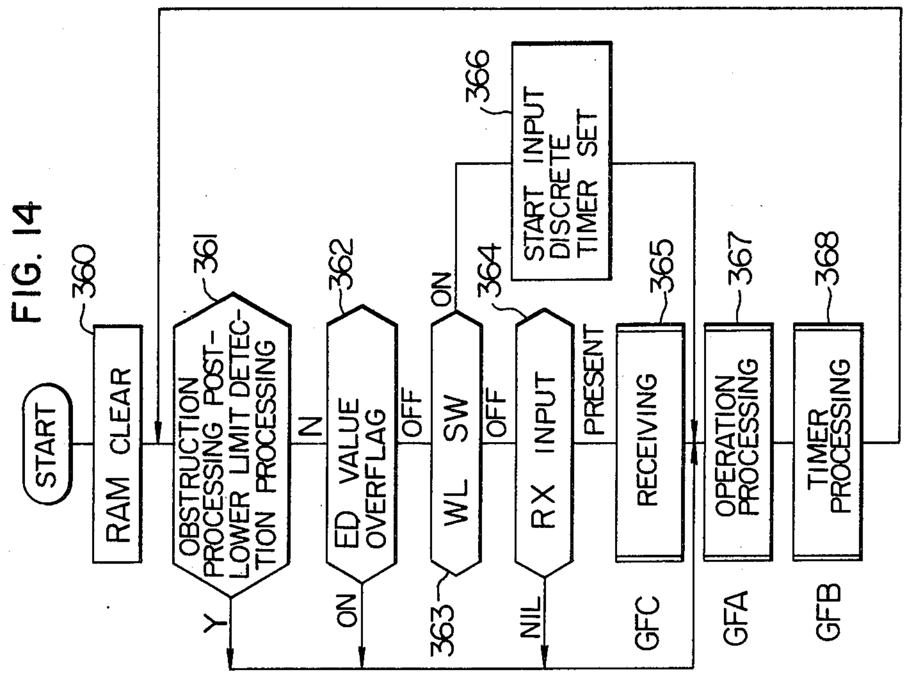
FIGS. 14 to 27 show flow charts of various operations.

The main flow chart according to the present invention is shown in FIG. 14. The processing steps are started after power is thrown in. First, the RAM clear step 360 is taken in order to set the temporary memory circuit 349 at initial condition. Next, the obstruction processing and post-lower limit detection processing 361 is checked. The obstruction processing represents the condition 310 in FIG. 6, and the post-lower limit detection processing represents the condition 309. During these processes, the door is inoperable by either the push button switch or the transmission-receiving. While these processes are not going on, the ED (number of starts) value overflag 362 is checked, and if the flag is "1", the door is also inoperative by the push button switch or the transmission-receipt. If the flag is "0", the on-off of the push button switch (hereinafter referred to as WL SW) is checked. When WL SW 363 is on, the start input discrete timer set 366 is taken. If WL SW 365 is off, in contrast, the receipt (hereinafter be referred to as Rx) which may input 364 is checked, and if it is at "1" level, transfer is made to the next receipt processing step 365. Then, through the operation processing 367 and the timer processing 368, the obstruction processing and the post-lower limit detection processing 361 is resorted to again, thus forming one cycle.

In this main flow chart, the operation process 367 will be explained below with reference to FIGS. 15 to 23.

Figure 15:
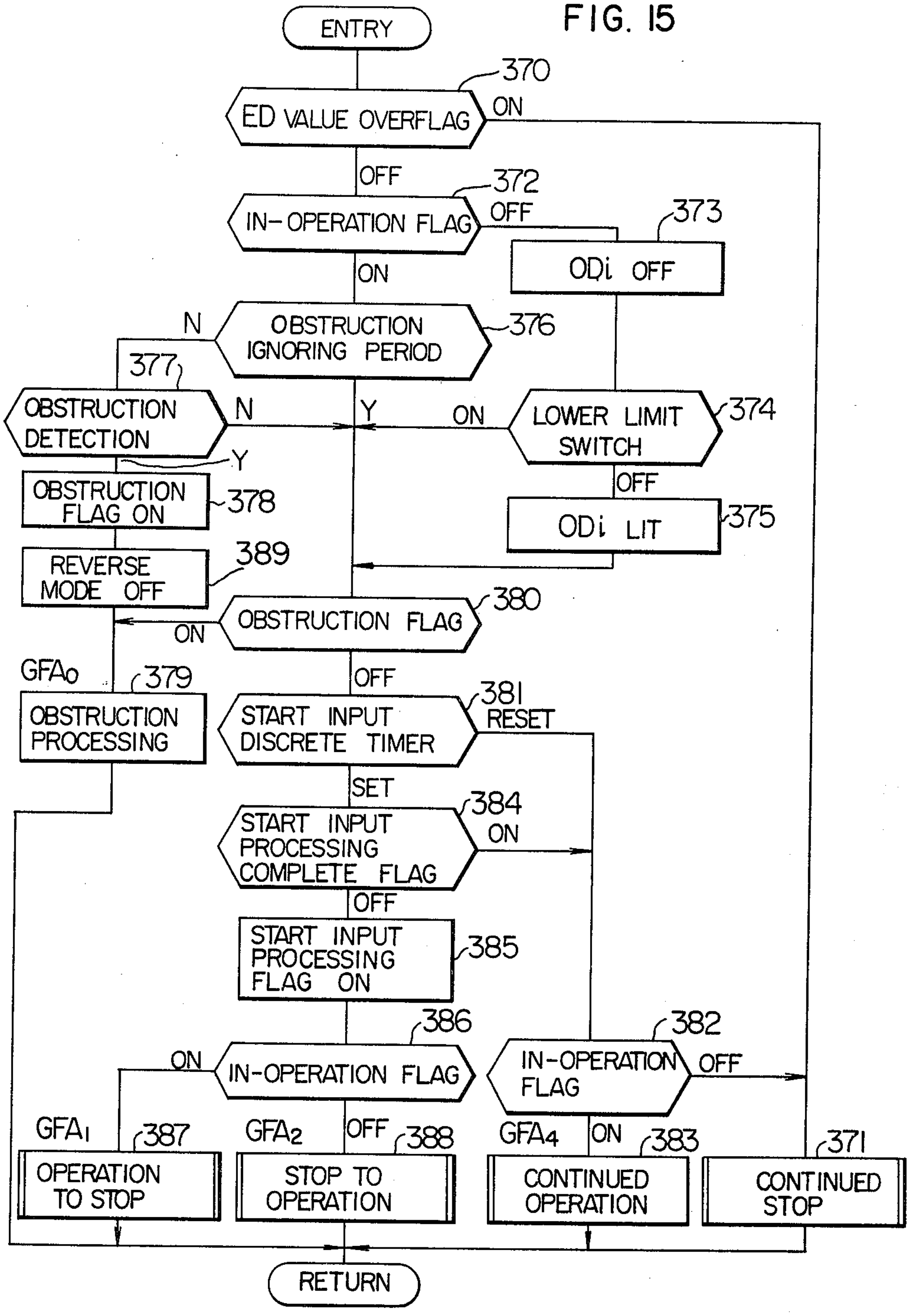

The main flow chart for operation processing is shown in FIG. 15. The ED value overflag 370 is checked. As explained with reference to FIG. 11, this ED value overflag 370 is raised when excessively frequent starts are detected during a limited time. In the case of flag on, the continued stop processing 371 is taken, so that the operating mode is in stoppage. When the flag is off, on the other hand, the in-operation flag 372 is checked.

When the in-operation flag is off, it means stoppage so that the open door indicator circuit 325 (hereinafter referred to as ODi) for indicating the door condition is temporarily turned off. After the step 373 of turning off ODi, the lower limit SW 374 is checked to see whether or not the door is located at the lower limit switch. If the lower limit SW 374 is off, the ODi turn on 375 in taken, while if 374 is on, the ODi 325 is kept off. By this process, the stationary condition 301 or condition 303 shown in FIG. 12 is indicated.

If the in-operation flag 372 is on, the obstruction ignoring period 376 is checked. This corresponds to the time of the timer $TM_6$ in the temporary memory circuit. The value of the timer $TM_6$ is checked, and if it is not a set value, one second has not yet passed after door start, so that the obstruction input is ignored. The reason for providing the obstruction ignoring period 376 is explained above and will not be referred to again.

If it is not in the obstruction ignoring period, the door in steady movement is indicated, and the obstruction detection 377 is checked to determine the presence or absence of an obstruction. If an obstruction signal is applied, the obstruction processing 379 is taken after the obstruction flag on 378 and the reverse mode off 389 processing.

In the obstruction ignoring period 376, it is determined whether the obstruction flag 360 is on or off. In the case of the obstruction flag on, the obstruction is being processed and the obstruction processing step 379 is taken. If the obstruction flag is off, by contrast, it is determined whether the start input discrete timer 381 is set or reset. This corresponds to the timer $TM_4$ in the temporary memory circuit. The timer $TM_4$ is set at 0.25 seconds when the door is in operation and at 0.5 seconds when the door is stationary. That the timer $TM_4$ is reset is indicative of the fact that no operating signal is applied, and it is necessary to continue the same door condition. Thus the in-operation flag 382 is checked, and if this flag is on, the door is in operation, so that the continued operation processing step 383 is taken, while if the same flag is off, the continued stoppage processing step 371 is taken.

When the start input discrete timer 381 is set, the start input process complete flag 384 is checked. In other words, it is determined whether quite a new operating signal or a signal once processed in involved. If the flag 384 is on, the same door condition is required to be continued, and a jamp is made to the step for checking the in-operation flag 382.

In the case where the start input complete flag is off, the start input complete flag on 385 is taken, followed by the checking of the in-operation flag 386. If this flag is on, on the other hand, the door is in operation and is required to be stopped. For this purpose, steps are taken from operation to stop 387.

In the case where the in-operation flag 386 is off, by contrast, the door is stationary and is required to be started. For this purpose, steps are taken from the stop to operation 388.

Figure 16:
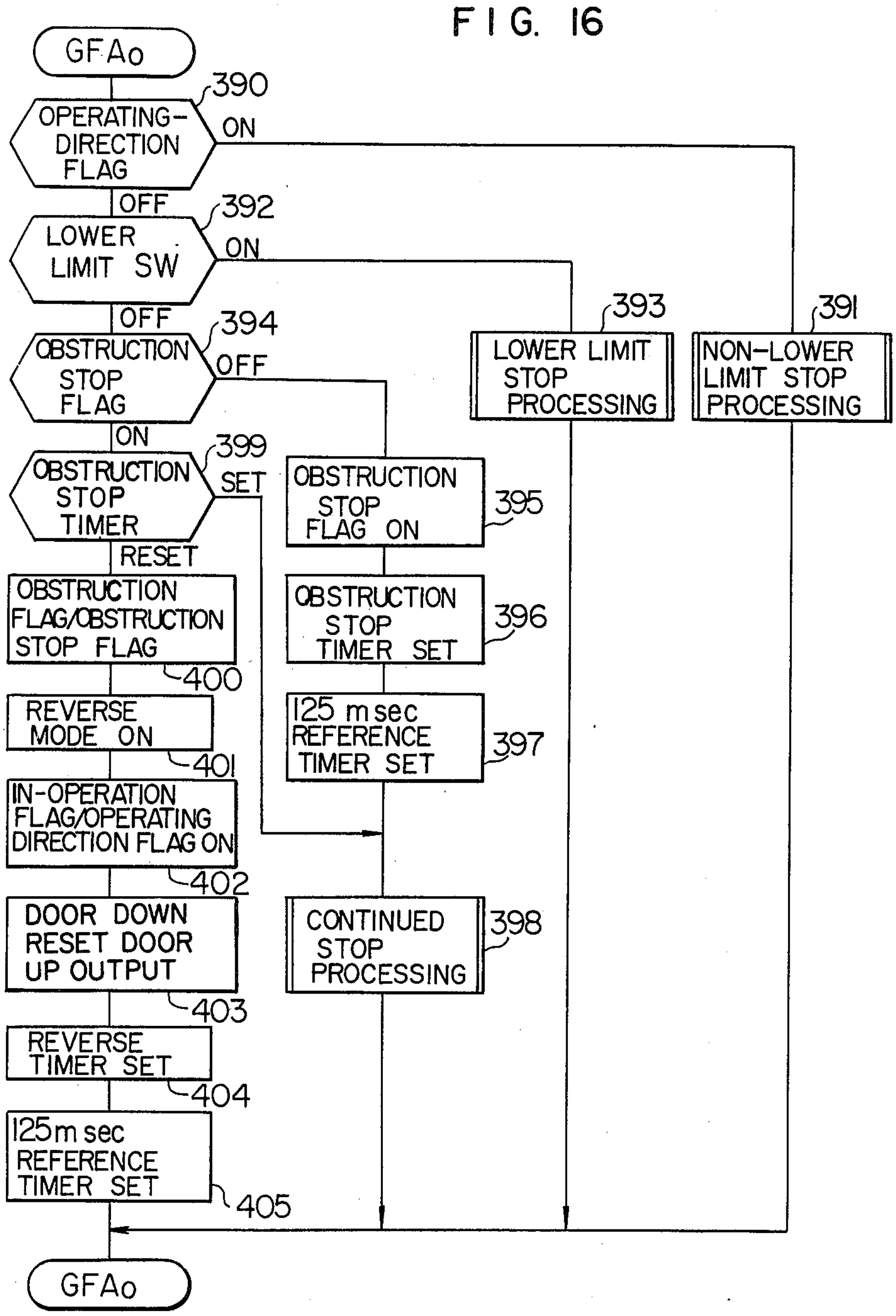

Next, the obstruction processing step 379 will be explained with reference to FIG. 16. This process includes the conditions 308, 309 and 310 shown in FIG. 16. The condition 309, however, concerns the obstruction detected during the fixed-time downward movement.

If it is found that the operating direction flag 390 is on as a result of checking the same, it means an upward movement and therefore the non-lower limit stop processing step 391 is taken for stopping the door. If the flag 390 is off, it means downward movement, and therefore the lower limit SW 392 is checked. If the lower limit SW 392 is on, the condition 309 is involved, so that there is no need for reversing but the lower limit stop processing step 393 is taken.

In the case where the lower limit SW 392 is off, the reverse·upward movement is required. Next, if the checking of the obstruction stationary flag 394 shows that it is off, the obstruction processing step 305 is required to be taken. In other words, the obstruction stationary flag on 395, the obstruction stop timer set 396 (corresponding to the timer $TM_6$ in FIG. 10), the 125 msec reference timer set 397 (corresponding to the timer $TM_3$ in FIG. 10), and the continued stop processing step 398 are taken.

In the case where the obstruction stationary flag is on, the obstruction stationary timer 399 is checked, and the door is required to be kept stationary until it is reset. The set time is 0.5 seconds in the present embodiment of the invention.

Assume that the stop timer 399 is reset. In order to realize the condition 306 in FIG. 6, the obstruction flag/obstruction stop flag off 400, the reverse mode on 401, the in-operation/operating direction flag 402, the door downward movement reset/door upward movement output 403, the reverse timer set 404 (corresponding to the timer $TM_6$ in FIG. 10), and the 125 msec reference timer set 405 (corresponding to the timer $TM_3$ in FIG. 10) are taken.

Figure 17:
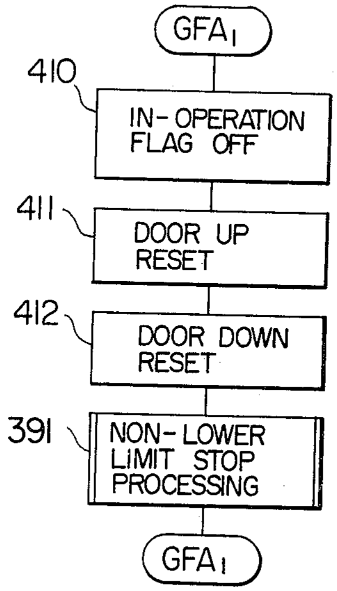

Next, the operation-to-stop processing step 387 will be explained with reference to FIG. 17.

As a process for stoppage, the in-operation flag off 410, the door upward movement reset 411, the door downward movement 412 and the non-lower limit stop processing step 391 are taken.

Figure 18:
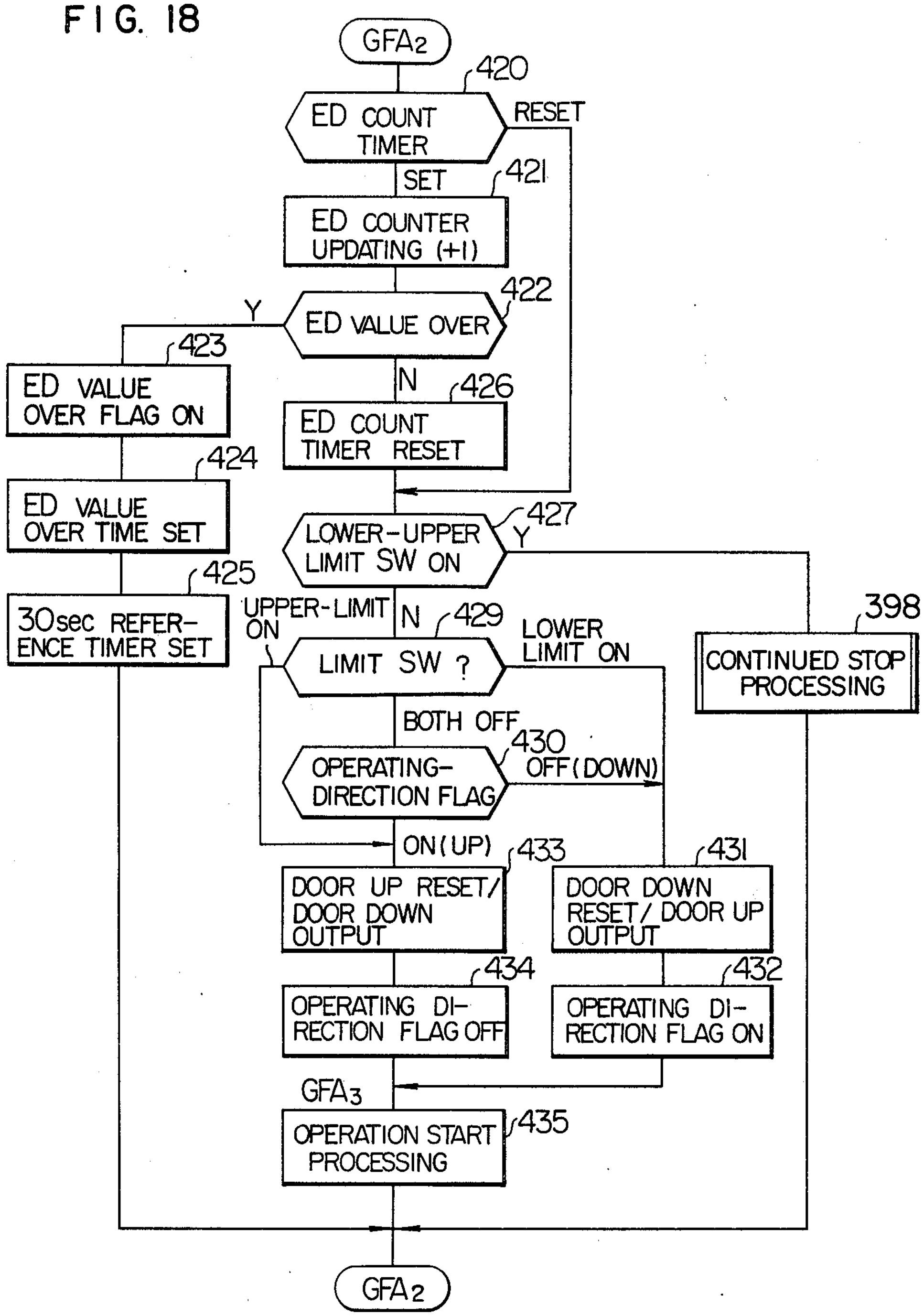

Now, the stop-to-operation processing step 388 will be explained with reference to FIG. 18.

First, it is determined whether the ED counter timer 420 is set. This corresponds to the timer $TM_{10}$ in FIG. 10. If it is set, the condition I shown in FIG. 11 is involved, so that the ED counter updating (+1) 421 is taken. If the timer is reset, on the other hand, it means the condition II.

Then the ED value over 422 is checked. If the ED value is exceeded, the ED value over flag on 423, the ED value over timer set 424 and the 30 sec reference timer set 425 (corresponding to the timer $TM_9$ in FIG. 10) are taken.

In the event that the ED value is not exceeded, however, the ED count timer reset 426 is taken for the purpose of initial clear of the ED counter.

Next, the upper-lower limit SW on 427 is checked. This is for determining a fault if both the upper and lower limit switches which are not noramlly simultaneously operable are on, in which case the continued stop processing step 398 is taken thereby keeping the door inoperative.

The limit SW 429 is checked. If the upper limit SW is on, the downward movement output is used; if the lower limit SW is on, the upward movement output is used; and if neither the upper or lower limit switch is on, the operating direction flag 430 is used, all to determine a mode. The limit SW input signal is given priority over the operating direction as a history mode. The operating direction flag, which is stored in the temporary memory circuit 349 in FIG. 9, is off in view of the fact that it is entirely cleared at the time of power throw-in. In other words, the flag is reversely indicative, i.e., the flag-off means an upward movement, and the flag-on the downward movement. In the case of flag off, therefore, the door downward movement reset/-door upward output 431 is taken, followed by the operating direction flag on 432 in order to indicate the downward movement that follows. By these processes, the door operating direction after power throw-in is fixed at upward movement.

In the case where the operating direction flag 430 is on, by contrast, the door upward movement reset/door downward movement output 433 and the operating direction flag off 434 are taken, thus determining that the next operating direction is up. After setting the operating direction flag, the operation start process 435 is taken.

Figure 19:
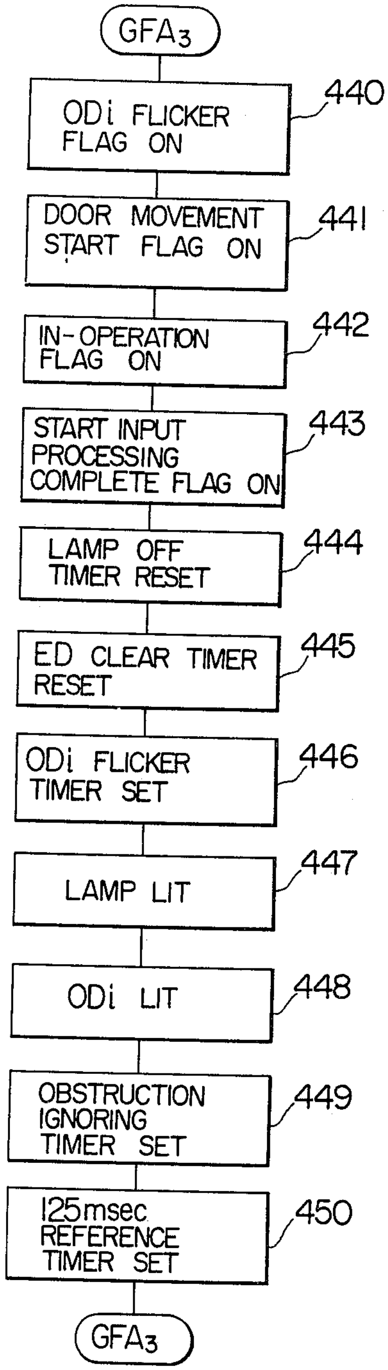

Next, the operation start processing step 435 will be explained with reference to FIG. 19.

In this process, before starting the operation, all related flags and timers are set and the lamp-on signal is produced.

Then, the ODi flicker flag on 440, the door movement start flag on 441, the in-operation flag on 442, the start input process complete flag on 443, the lamp off timer reset 444 (corresponding to the timer $TM_{12}$ in FIG. 19), the ED clear timer reset 445 (corresponding to the timer $TM_{11}$ in FIG. 10), the ODi flicker timer set 446 (corresponding to the timer $TM_5$ in FIG. 10), the lamp on 447, the ODi turn on 448, the obstruction ignoring timer set 449 (corresponding to the timer $TM_6$ in FIG. 10), and the 125 msec reference timer set 450 (corresponding to the timer $TM_3$ in FIG. 10) are taken in that order.

Figure 20:
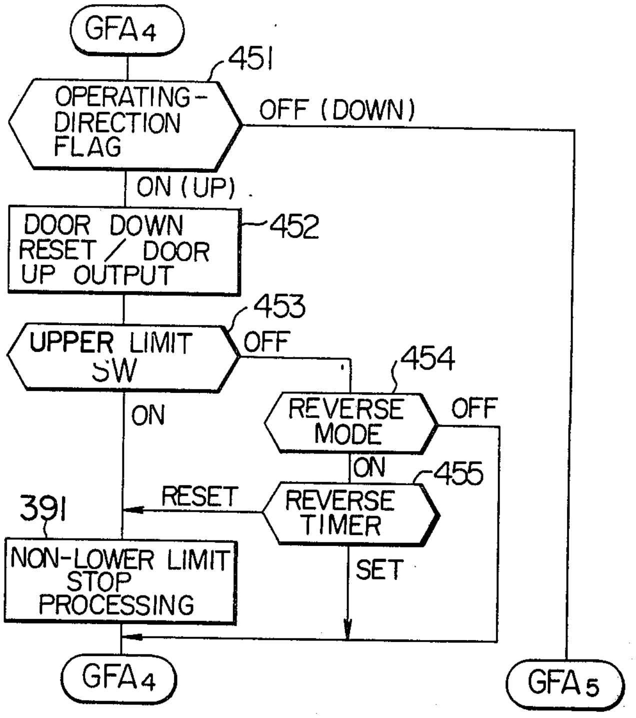
Figure 21:
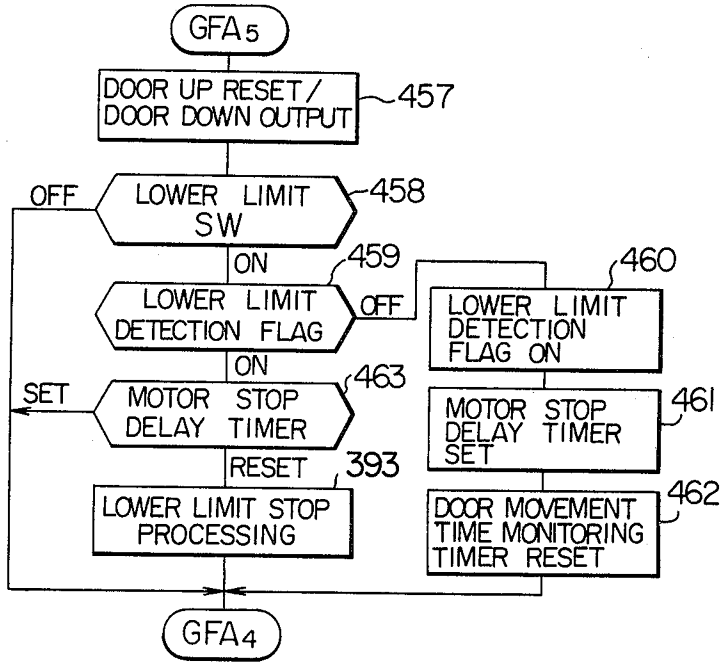

The in-operation processing 383 will be explained with reference to FIGS. 20 and 21.

In this process, the states 304 and 306 shown in FIG. 6 are primarily executed. First, the operating direction flag 451 is checked, and if it is on, the door downward movement reset/door upward movement output 452 is always taken. After that, the upper limit SW check 453 is made, and if it is on, the non-lower limit stop processing 391 is taken. If the upper limit SW is off, the reverse mode 454 is checked. In the case where this mode 454 is on, the reveser timer is checked at 455. This timer is $TM_6$ in FIG. 10 and when it is reset, it shows one foot up as shown in the state 306 in FIG. 6. Therefore, the next process to be taken is the lower limit stoppage. If the timer $TM_6$ is set, by contrast, the operation is continued.

The operating direction flag 451 is checked and if it is off, the door upward movement reset/door downward movement output 457 is always repeated. Then, the lower limit SW 458 is checked, and if it is on, the lower limit detection flag 459 is checked. If the same flag is off, by contrast, it is immediately after the lower limit input, so that the lower limit detection flag on 460 is taken while at the same time taking the motor stop delay timer set 461. This corresponds to the timer $TM_2$ in FIG. 10. Next, the door movement time monitoring timer reset 462 is taken. This corresponds to the timer $TM_8$ in FIG. 10.

In the case where the lower limit detection flag 459 is on, the motor stop delay timer is checked at 463. If it is reset, it confirms that the door has moved down for a predetermined length of time as shown in the state 304 in FIG. 6, and therefore the following step to be taken is the lower limit stop processing 393.

According to the embodiment of the invention under consideration, the timer $TM_2$ is set at 225 msec.

Figure 22:
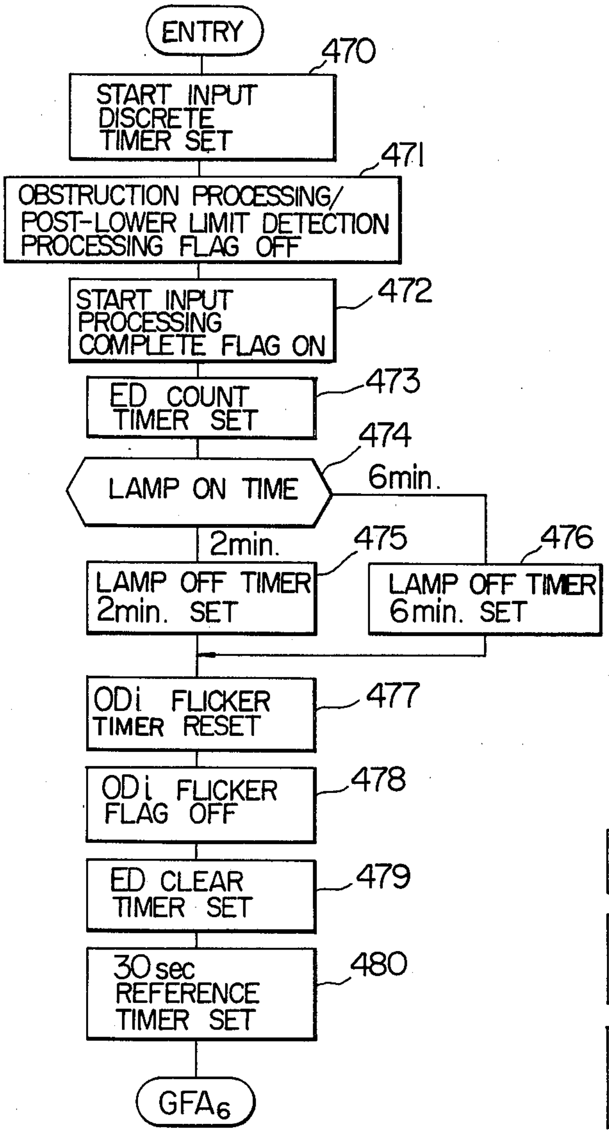
Figure 23:
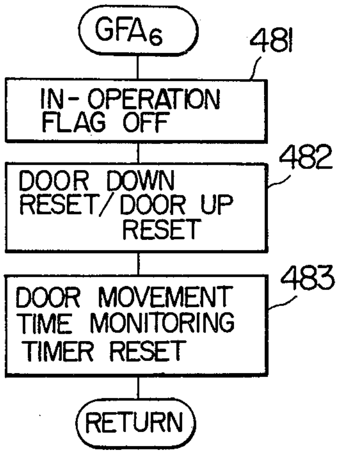
Figure 24:
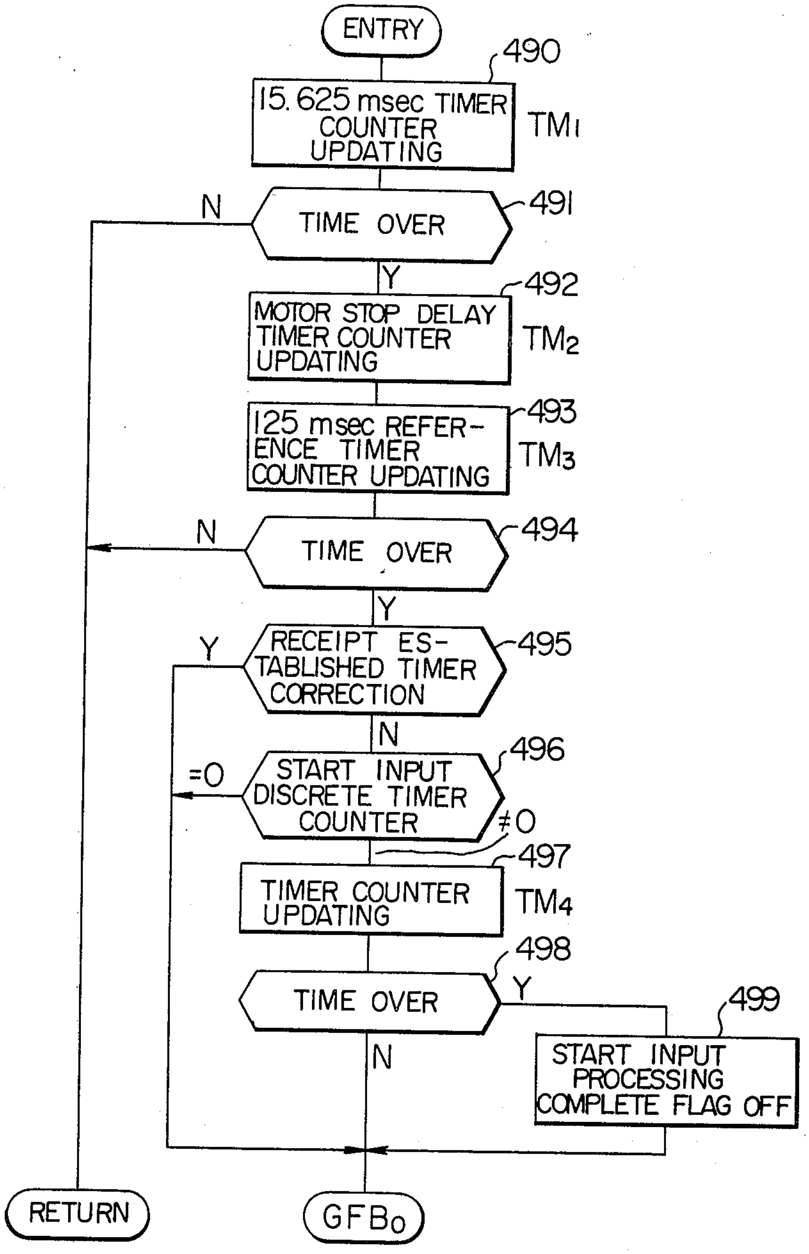
Figure 25:
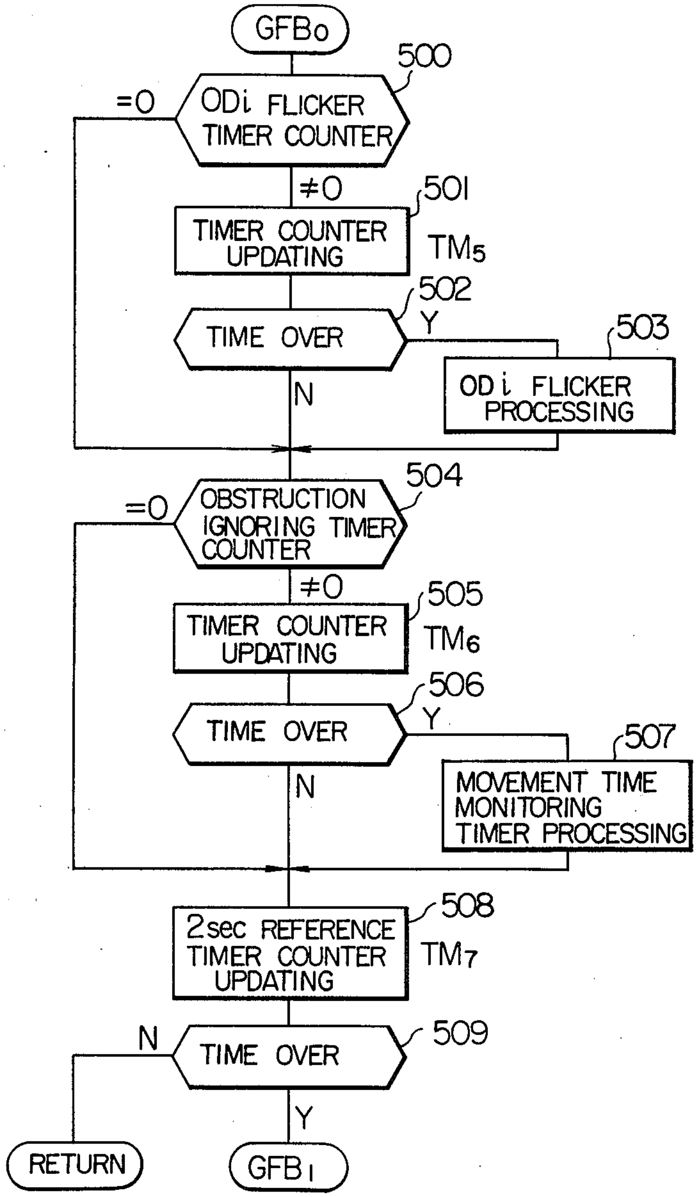
Figure 26:
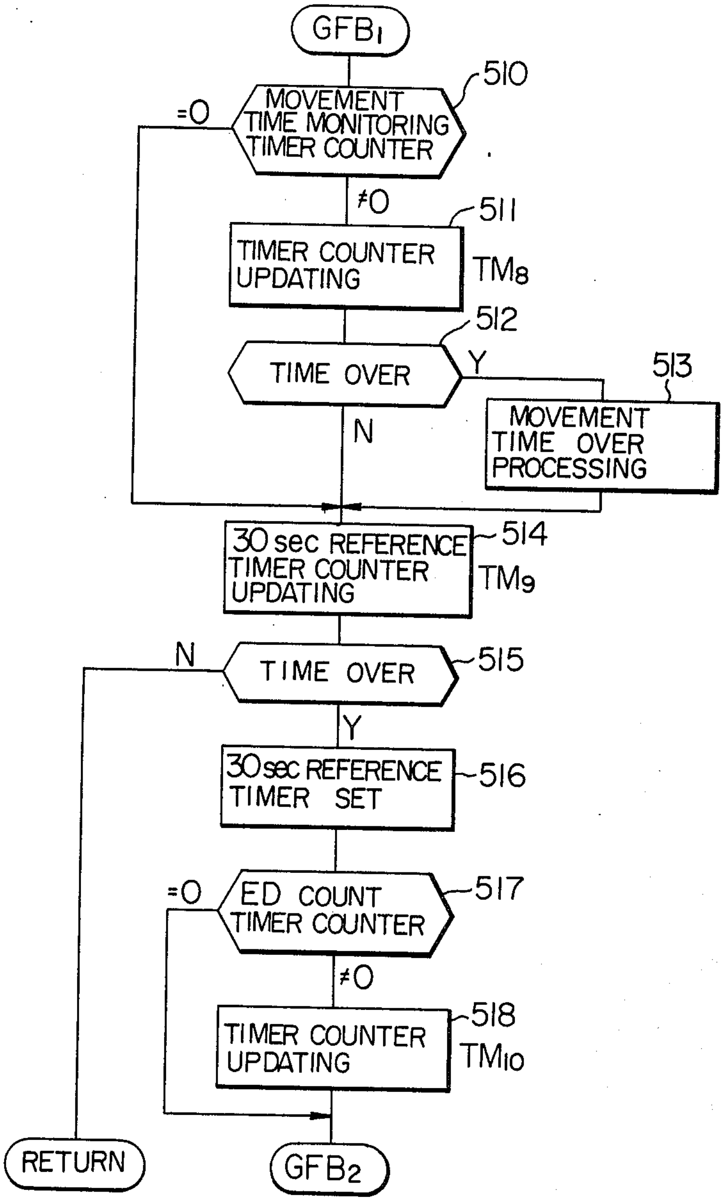
Figure 27:
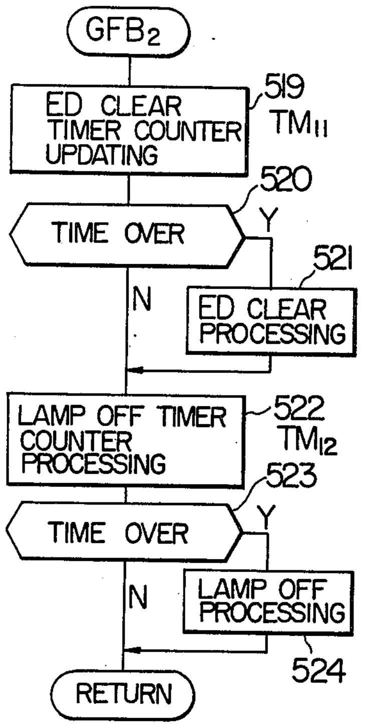

Next, the lower limit stop and non-lower limit stop processing will be explained with reference to FIGS. 22 and 23, and the continued stop processing with reference to FIG. 23.

The start input discrete timer set 470, the obstruction processing/post-lower limit detection processing flag off 471, and the start input process complete flag on 472 are taken. The stoppage in response to the operating command input is considered the same as the stoppage in response to the input to the upper or lower limit switch.

Next, the ED count timer set 473 is taken. This corresponds to the timer $TM_{10}$ in FIG. 10.

In order to determine the lamp-on time, the two-minute or six-munute select signal set by the additioanl circuit 316 in FIG. 8 is checked at the lamp-on time 474, and also the lamp-off timer two minutes 475 or the lamp-off timer six minutes 476 is selected. Next, the ODi flicker timer reset 477, the ODi flicker flag off 478 and the ED clear timer set 479 are taken. This corresponds to the timer $TM_{11}$ in FIG. 10 which is set at six minutes in this embodiment of the invention. Next, the 30-sec reference timer set 480 is taken.

The next steps to be taken include the in-operation flag off 481, the door downward movement reset/door upward movement reset 482 and the door movement time monitoring timer reset 483 are executed.

The timer processing 368 in the main flow chart of FIG. 14 will be explained below with reference to FIGS. 24 to 27. In the processing sections of this flow chart, the number of steps of each section are counted by itself and used as a timer, and each timer counter corresponds to a related element in FIG. 10. In the flow charts under consideration, marks will be attached to clarify the correspondence on the map.

The 15.625 msec timer counter updating 490 is taken and the time over of the timer $TM_1$ is checked for at the time over 491. One cycle of the main flow chart includes 97 steps. When this is counted in four bits, a time over occurs at the 16th time, resulting in an overflow. One step is 10 $\mu$sec, so that one cycle corresponds to $16 \times 97$ steps $\times 10\ \mu\text{sec} = 15.52$ msec. The time of 15.625 msec was considered because of the relation with a higher order counter contents 125 msec, and it is assumed that the basic parts already include an error of about 1%. The output of the time over 491 is produced at intervals of 15.625 msec, which output is processed through the motor stop delay timer counter updating 492 (timer $TM_2$) and the 125 msec reference timer counter updating 493 (timers $TM_3$ which count $+2$ each), with the result that the overflow time of 125 msec at the time over 494 is assured.

The next step, i.e., the receiving established timer correction 495 will be described later. In the timer correction for this step, the discrete timer is not updated. In the absence of the receiving established timer correction, the start input discrete timer counter 496 is checked. When the count is not zero, the timer counter updating 497 (timer $TM_4$) is executed and checked at the time over 498. If there is a time over, the start input process complete flag off 499 is taken.

The ODi flicker counter 500 is checked. When the count is not zero, the timer counter updating 501 (timer $TM_5$) is executed and checked at time over 502. If there is any time over, the ODi flicker processing step 503 is taken. In other words, the ODi is made to flicker by the ODi flicker flag, and thus the conditions 300 and 302 in FIG. 12 are executed.

Next, the obstruction ignoring timer counter is checked at 504. If it is not zero, the timer counter updating 505 (timer $TM_6$) is taken and checked at time over 506. If there is a time over, the movement time monitoring timer processing step 507 is taken. At this step, the door movement start flag is made off and the movement time monitoring timer is set.

Up to this point, the 2-sec reference timer counter updating 508 (timer $TM_7$) is executed and checked at time over 509. If there is a time over, it involves the passage of two seconds.

Next, the movement time monitoring timer counter 510 is checked. If it is not zero, the timer counter updating 511 (timer $TM_8$) is taken and checked at time over 512. If there is any time over, the movement time over processing is effected. In this case, the obstruction flag on and the reverse mode off are involved. In other words, a time over occurs 25 seconds after door start in the absence of an input from the upper limit switch, the lower limit switch or the obstruction limit switch. This output is equivalent to the obstruction detection.

Next, the 30-sec reference timer counter updating 514 (timer $TM_9$) is taken and checked at time over 515. If there is any time over, the lapse of 30 seconds is involved.

The 30 sec reference timer set 516 is then taken. This is for the reason that the 30-sec reference timer $TM_9$ is based on the timer $TM_7$, and overflow is required at the count 15. The counter for the timer $TM_9$ is set at "1".

The ED count timer counter 517 is checked. If it is not zero, the timer counter updating 518 (timer $TM_{10}$) is taken.

Next, the ED clear timer counter updating 519 (timer $TM_{11}$) is taken and checked at the time over 520.

If there is a time over, the ED clear processing is effected at 521. In this process, the ED counter is cleared and the ED value over flag is turned off, attaining the condition equivalent to the state III in FIG. 11.

Next, the lamp-off timer counter updating 522 (timer $TM_{12}$) is executed and checked for time over at 523. If there is any time over, the lamp off processing step 524 is taken.

Prior to explaining the receiving process 365 in the main flow chart of FIG. 14, the transmission-receiving system will be described again.

Figure 28:
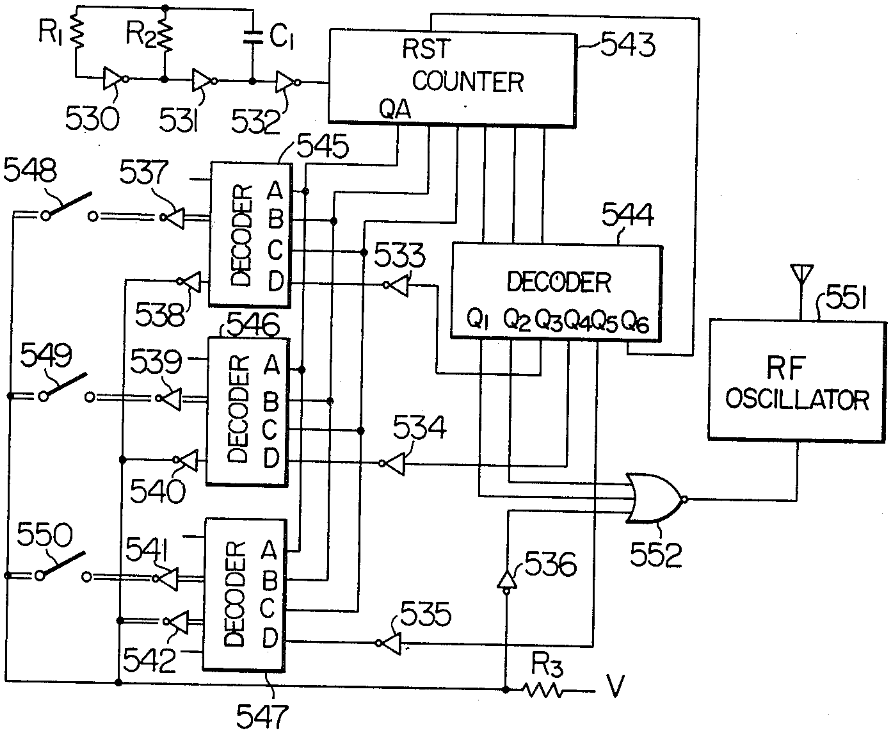
FIG. 28 is a diagram showing the circuit of a radio control transmitter.

An example of the circuit for the transmitter 331 will be explained with reference to FIG. 28. Inverters 530, 531, resistors $R_1$, $R_2$ and a capacitor $C_1$ make up an oscillator circuit, the output of which is applied through an inverter 531 to a counter 543. The three lowest-order bits of the counter 543 are applied to the decoders 545, 546 and 547, while the three highest-order bits are applied to the decoder 544. The outputs $Q_1$ to $Q_5$ obtained by decoding the highest three bits are equivalent to eight times the least bit QA of the counter 543. Thus the outputs $Q_1$ to $Q_5$ of the decoder 544 make up 40 bits. The outputs $Q_1$ and $Q_2$ are applied to a 3-input NAND 552, thereby making up a synchronizing signal of 16 bits. At output $Q_3$, the decoder 545 is selected through the inverter 533, so that the three lowest bits of the counter 543 are decoded and the output of the deocder 545 is applied to an inverter 537 of open drain type (corresponding to six inverters). Thus the same output sequentially scans the bit switch 548 with six contacts providing a bit setting part, and the on-off data is applied to the 3-input NAND 552 through the inverter 536. In similar fashion, by way of the output $Q_4$ of the decoder 544, the decoder 546 is selected through the inverter 534, and the output of the decoder 546 scans the bit switch 549 (with six contacts) through the inverter 539 of open drain type (corresponding to six inverters). Also, by way of the output $Q_5$ of the decoder 544, the decoder 547 is selected through the inverter 535, and the output of the decoder 547 is applied to the inverter 541 (with three inverters) of open drain type, thus sequentially scanning the bit switch 550 with three contacts. The inverters 538 and 540 of open drain type correspond to the stop bit SP, while the inverter 542 with three inverters 3 of open drain type corresponds to one frame of stop bits FSP.

By this operation, the RF oscillator 551 making up a UHF oscillator section is subjected to on-off control by the three-input NAND 552, thus producing an electric wave output of the transmittor 331 as shown in FIG. 13.

The data thus transmitted is received by the receiving circuit 330 including a super regeneration circuit, and then applied to the logic processing circuit 311 including a bit setting circuit 321.

Figure 29:
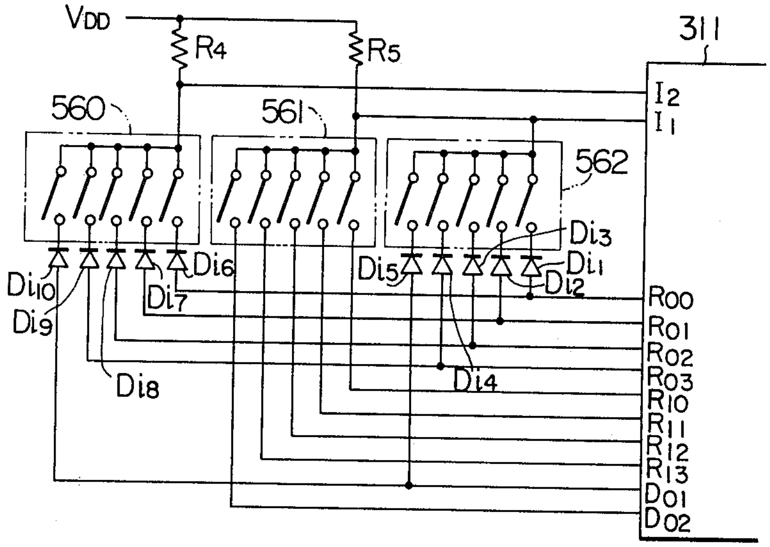
FIG. 29 is a diagram showing a bit-setting circuit.

An embodiment of the bit setting circuit 321 is shown in FIG. 29. This circuit comprises bit switches 560, 561, 562, and diodes $Di_1$ to $Di_{10}$ and sequentially controls the 10-bit outputs of the logic processing circuits $R_{00}$ to $R_{03}$, $R_{10}$ to $R_{13}$ and $D_{01}$ to $D_{02}$, so that only one bit is kept at "1" while the other nine bits are made "0" (in high impedance condition in spite of open drain type), with the result that the on-off data of the bit switches is collected by way of input ports $I_1$ and $I_2$.

Figure 30:
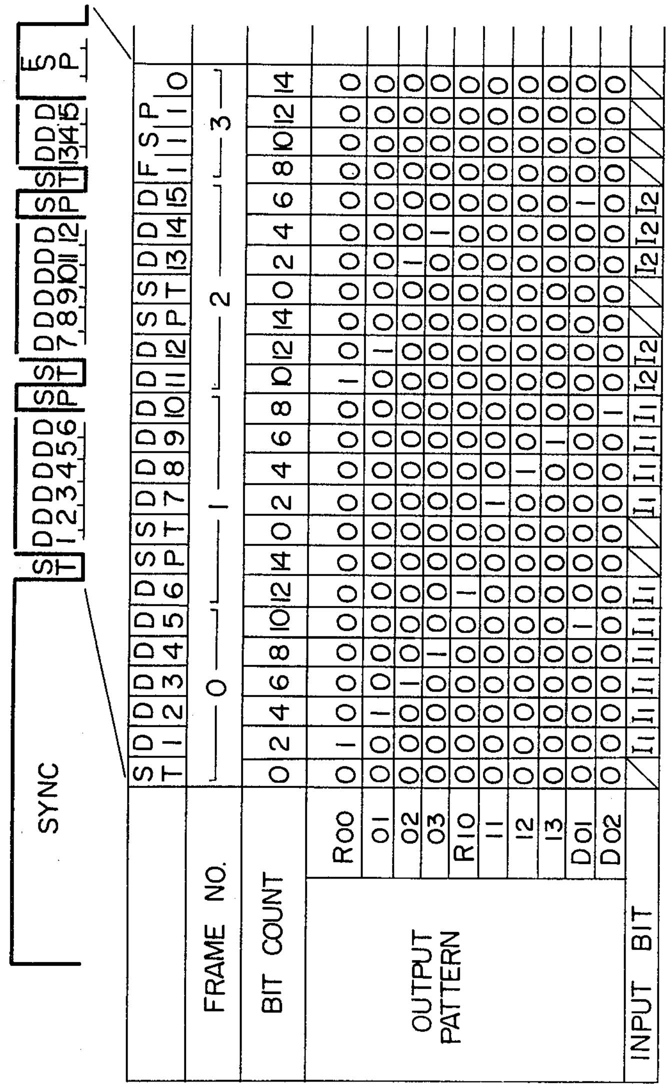
FIG. 30 shows bit-setting patterns.

FIG. 30 shows a set pattern for collection of the bit switch data. The frame No. corresponds to the data, the data $D_1$ to $D_5$ corresponding to frame No. 0, the data $D_6$ to $D_{10}$ to frame No. 1, the data $D_{11}$ to $D_{15}$ to frame No. 2, and the frame stop bit to frame No. 3. Also, as a bit counter, an even number is assigned to each bit between start bit SP and stop bit SP. The output pattern and the input port for collection of the bit switch data are also shown.

Next, the receiving process will be explained below with reference to FIGS. 31 to 37. First, explanation will be made with reference to FIG. 31.

Figure 37:
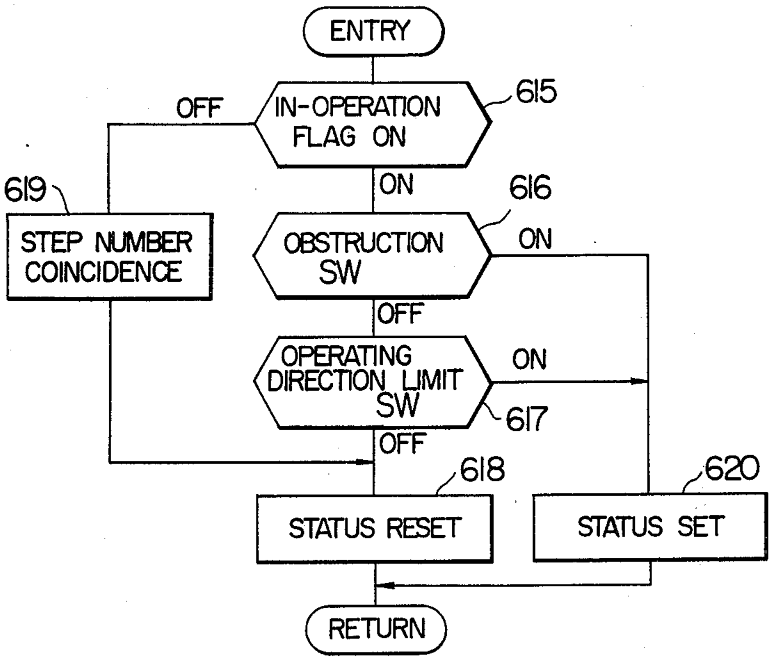

The obstruction limit SW check 570 is for checking the limit SW of an obstruction and the operating direction while the door is in operation. When the door is not in operation, the number of processing steps is rendered coincident, as the detail thereof is shown in FIG. 37. If an obstruction is found by this process or the operating direction limit SW is on, the status flag (located within the condition indication register of FIG. 9) is set.

The next step is the checking of the obstruction limit SW input 571 which is effected by checking the above-mentioned status flag. If the status flag is on, a jump is made to GFC1. When the status flag is off, on the other hand, the sync signal counter updating 572 is taken. The sync signal counter is provided by eight bits as shown in FIG. 10 within the temporary memory circuit 349 shown in FIG. 9. It is determined whether or not the value of the above-mentioned counter is maintained for longer than a predetermined length of time. In other words, the maximum value of the waveform applied as an original sync signal is set. And if the counter value is larger than that maximum value, an abnormality is judged and a jump is made to GFC1.

If the result of the step sync signal counter 2 upper limits 573 is "No", the step "the received data is 0" is taken at 574, thus determining whether or not the data is zero, i.e., whether or not the sync signal is ended. If the data is not zero, the processes are returned to the obstruction limit SW check 570. The loop $L_1$ shown in the drawing is repeated till the received data becomes zero. If the data is zero at the step 574 "received data=0", the sync signal counter 2 lower limit 575 is checked. In other words, the maximum value of the waveform applied as an original sync signal is set, and if the count is lower than that, an abnormal condition is judged and a jump is made to GFC1.

If the result of the sync signal counter 2 lower limit value 575 is "Yes", the DiPSW read output pattern initial value set 576 and the frame No. initial value as set 577 are taken as shown in FIG. 30.

Next, the flow chart of FIG. 32 will be explained.

Figure 31:
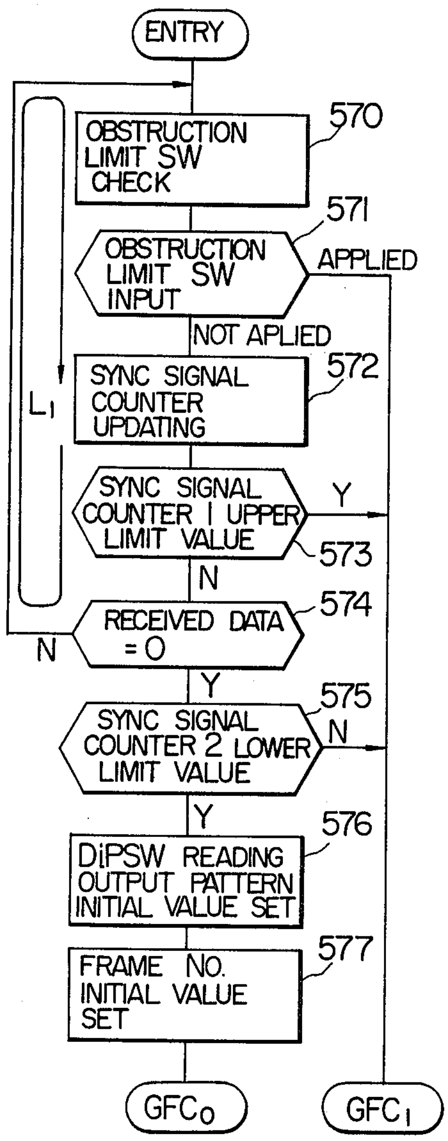
FIGS. 31 to 37 show flow charts for various operations.

The sampling timing counter initial value set 578 is taken. In this process, with the next bit counter initial value set 579 set, the length of time required for processing the sync signal counter 2 lower limit 575, the DiPSW read output pattern initial value set 576 and the frame No. initial value set 577 in FIG. 31 is corrected as an error before the sampling start.

The obstruction limit SW check 580 checks the obstruction or the operating direction limit switch when the door is in operation. When the door is not in operation, the number of processing steps is made coincident with each other, as the detail thereof is shown in FIG. 37. In this process, in the presence of an obstruction or when the operating direction limit SW is on, the status flag (located in the condition indication register of FIG. 9) is set.

The next process of checking the obstruction limit SW input 581 is performed by checking the above-mentioned status flag. When the status flag is on, a jump is made to GFC1.

Next, the start bit sampling 582 is checked. As mentioned above, the sampling period is 1/32 for the start bit, and 1/16 for the others. If the answer is "Yes" in this step, the sampling counter updating 583 updates by +2 to 1/32, while the sampling counter 584 updates by +1.

The sampling time over 585 is checked, and if the time is not yet over, the obstruction limit SW check 580 is returned to. The loop $L_2$ in the drawing is repeated until a sampling time over.

Figure 32:
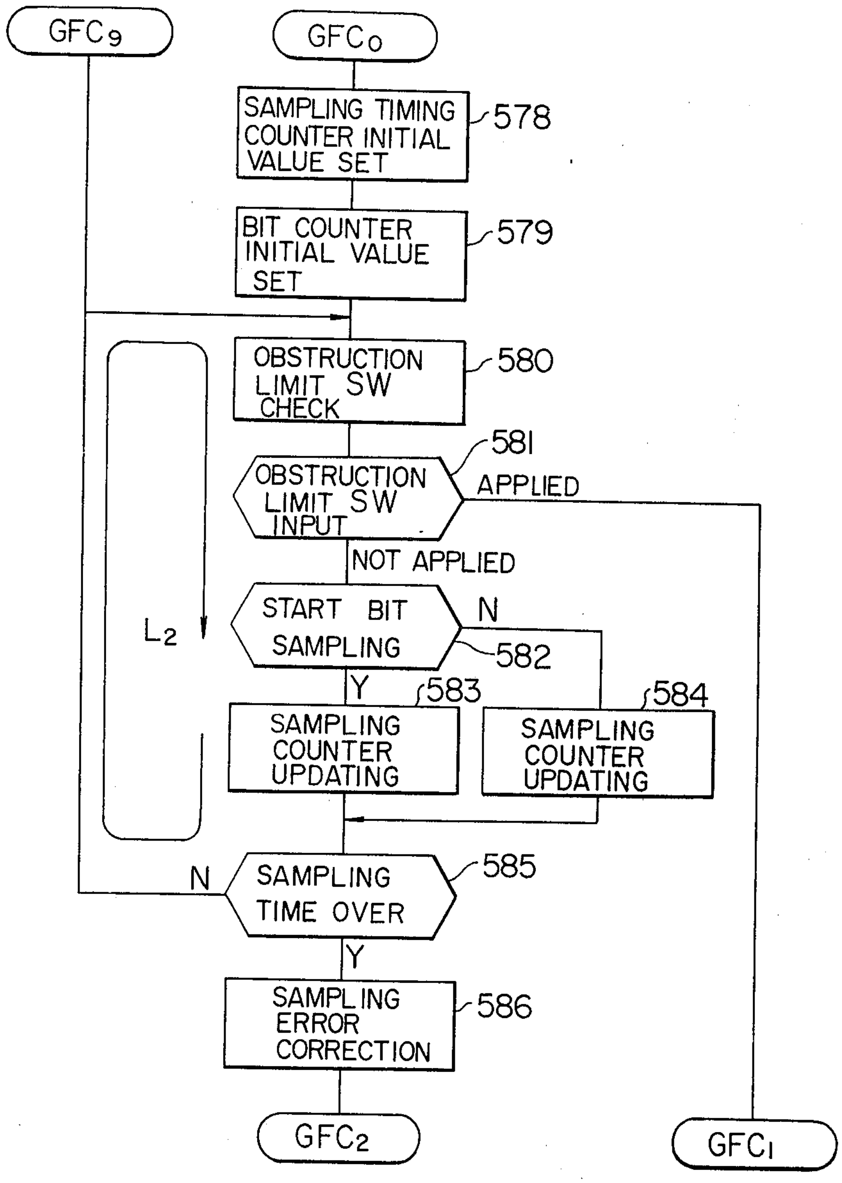

The number of processing steps of the loop $L_1$ in FIG. 31 is rendered the same as the number of processing steps of the loop $L_2$ of FIG. 32. If the answer at the sampling time over 585 is "Yes", the sampling error correction 586 is taken.

The number of processing steps at the $L_1$ loop is 32. Therefore, 32 processing steps per loop multiplied by 1/16 equals two processing steps per loop. Thus the value of the lower digits of the sync counter is counted as two processing steps for each count, thus correcting the error.

Next, the flow chart of FIG. 33 will be explained. The received data is collected into the carrier at 778. This carrier is included in the condition indication register 346 shown in FIG. 9. Next, it is determined at the frame No. 3 at 779 whether or not the frame No. 3 is involved, i.e., whether or not the frame stop bit FSP is involved. If it is involved, a jump is made to GFC3. If the answer is "No", on the other hand, the next step is taken to check the start bit 780. Whether or not it is a start bit is judged with reference to the bit count. If the bit count is zero, a jump is made to GFC4. If the bit count is not zero, by contrast, the next step is taken thereby to check the stop bit 781. Whether or not a stop bit is involved is determined from the bit count. If the bit count is 14, a jump is made to GFC5.

If it is not a stop bit, on the other hand, the DiPSW output $D_{01}$ and $D_{02}$ reset 782 and the DiPSW read output pattern load 783 are taken. This is followed by the checking of the frame No. 1 at 784. If the frame No. is not 1, the DiPSW output 0 to 3 output 785 is taken. Then the output patern 786 is checked, and if it is zero, the DiPSW output $D_{01}$ output 787 is taken; while if the above-mentioned output pattern is zero, on the other hand, the DiPSW output $D_{01}$ reset 788 is taken. As will be seen from the output pattern, $R_{00}$ to $R_{03}$ are a 4-bit latch, while $D_{01}$ is a 1-bit latch. Because of this configuration, the above-mentioned method for setting the output pattern is used. This is also the case with the DiPSW output 4 to 7 output 789, the checking of the output pattern 790, the DiPSW output $D_{01}$ output 791 and the reset of the DiPSW output $D_{02}$ at 792 for frame No. 1.

Next, the flow chart of FIG. 34 will be explained. After it is determined that a stop bit input is involved by the checking of the stop bit 581 in FIG. 33, the stop bit normal 593 checks to see that the particular signal is a stop bit, i.e., "1". If a "0" input is involved, it is not a stop bit. This is not a normal condition and therefore subsequent sampling steps are not taken, but a jump is made to GFC1.

If the checking of the stop bit normal 593 shows that a normal stop bit is involved, the next step is taken. The checking of the received data 594, the obstruction limit SW check 595 and the obstruction limit SW input check 596 are repeated. In the meantime, after confirming at the received data 594 that the received data is "0", this loop is left and transferred to the next sampling counter initial value set 598. After that, a jump is made to GFC10. In this process, the level check is effected at the received data 594. In view of the fact that a new sampling is started from the fall point of the particular signal, the error up to that point of sampling is eliminated.

If the output pattern is not "0" as a result of the checking at the "output pattern=0" at 607, the processing in the same frame is being conducted, and the output pattern updating (double) 610 is taken.

The next step is the sampling counter initial value set 610, followed by the bit counter updating (+2) at 611. A jump is made to GFC9 shown in FIG. 32.

Figure 35:
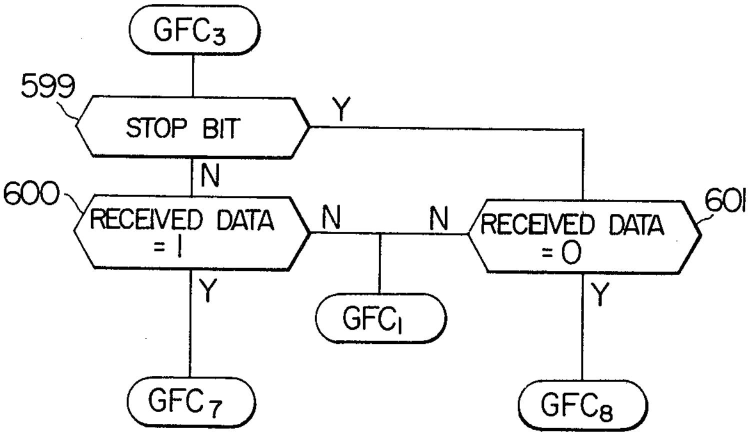

In FIG. 35, a jump is made to GFC8 in response to a data coincidence. This requires an average processing time of 80 msec in the receiving process flow chart (because one bit requires 2 msec and one frame 40 bits).

As a result, the receiving process 365 in FIG. 14 greatly affects the timer processing 368. To prevent this inconvenience, according to the embodiment under consideration, the 15.625 msec timer at the timer processing 368 is called five times at the timer counter correction 612. By approximate processing, the main timer is thus corrected.

Next, the start input discrete timer set 613 is taken, followed by the receiving process counter zero clear/receiving i/0 port reset 614.

Figure 33:
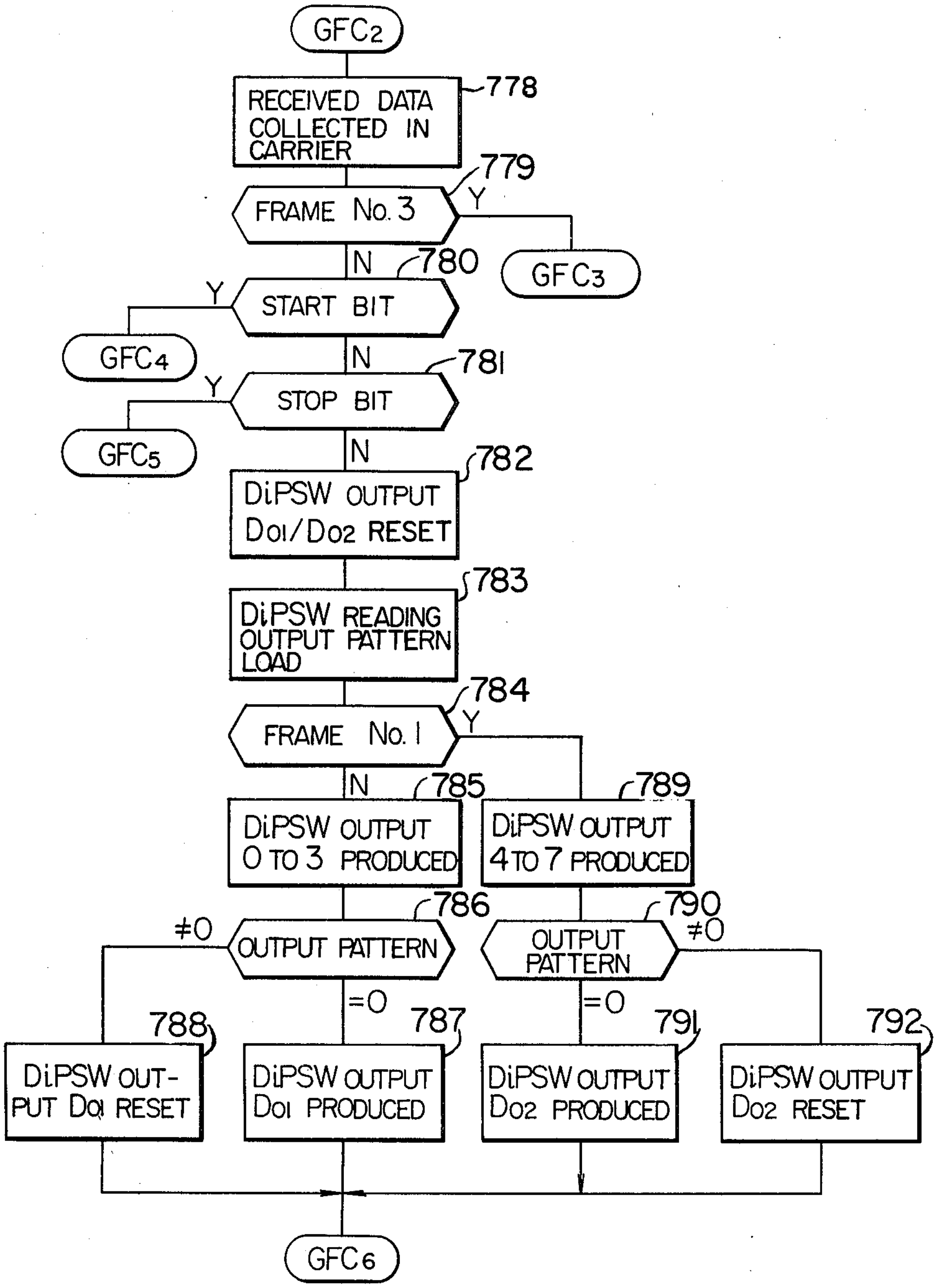
Figure 34:
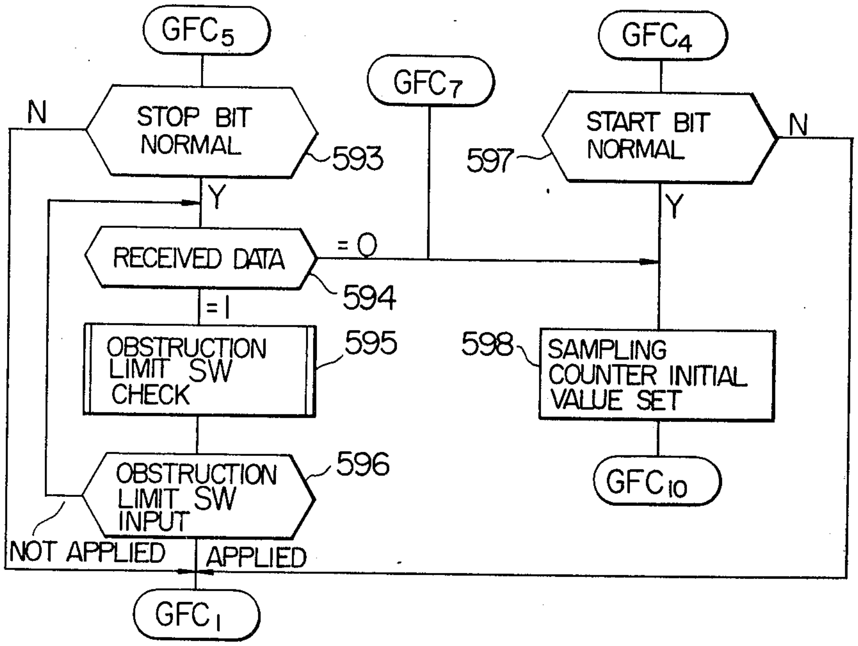

After it is decided that a start bit input is involved at the start bit 580 in FIG. 33, the start bit normal 597 checks to see that the particular signal is a start bit, i.e. "0". If it is a "1" signal, by contrast, it is not a start bit, and therefore a normal receiving condition is not involved, so that subsequent sampling processes are eliminated. Instead, a jump is made to GFC1.

If the checking at the start bit normal 597 shows a normal start bit, the next step, i.e., the sampling counter initial value set 598 is taken.

The process shown in FIG. 35 is made in the case where it is determined that the frame No. 3 is involved by the checking of the frame No. 3 579 in FIG. 33.

Whether or not a stop bit is involved is determined by a bit counter at the stop bit 599. If the bit count is 8, 10 or 12, the "received data=0" is taken at 600.

If the bit count is any one of the above-mentioned values, the received data must be "1", in which case a jump to GFC7 shows a normal condition. If the received data is "0", by contrast, the receiving condition is abnormal and a jump is made to GFC1.

Also, if the checking of the stop bit 599 shows that the count is 14, the "received data=0" 601 is checked. When the bit count is 14 as shown above, the received data is required to be "0", and the jump to GFC8 is normal. If the received data is "1", on the other hand, the receiving condition is abnormal and a jump is made to GFC1.

Figure 36:
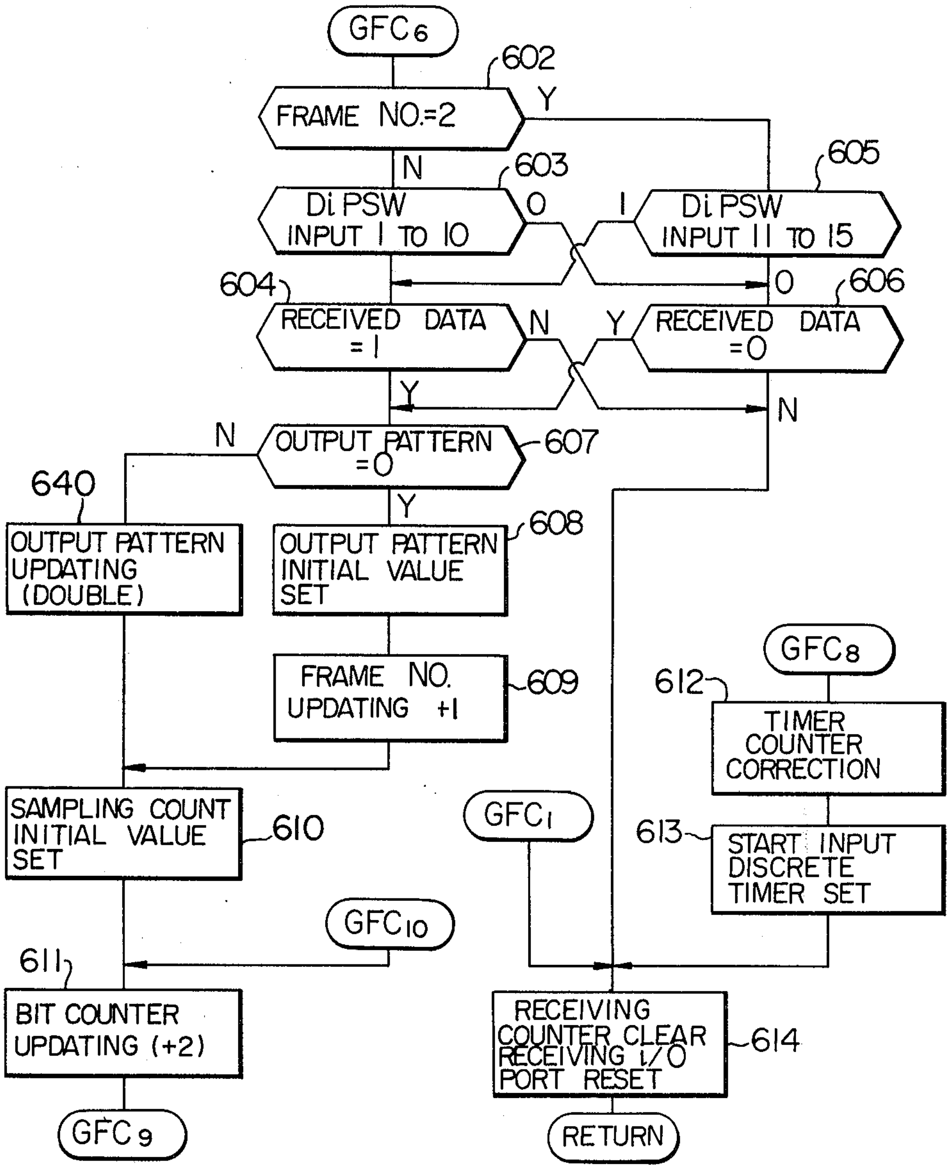

FIG. 36 shows a continuation of the processes from FIG. 33. By checking the "frame No.=2" at 602, the input port of the DiPSW set is discriminated. If frame No.=2 as shown in FIG. 30, the input port is $I_2$ corresponding to DiPSW inputs 11 to 15. Thus the DiPSW inputs 11 to 15 are checked at 605, and if it is "1", the "received data=1" at 604 is checked. If the signal is "0", by contrast, the "received data=0" at 606 is checked. If coincidence is attained as a result of checking, the "output pattern=0" at 607 is checked. In the case of failure to coincide, on the other hand, the receiving process counter zero clear/receiving process i/0 port reset 614 is taken.

If the frame No. is not 2 in this case, the input port is $I_1$ which corresponds to the DiPSW inputs 1 to 10. Thus, the DiPSW inputs 1 to 10 are checked at 604, and if it is "0", the "received data=0" at 606 is checked. If coincidence is attained, the "output pattern=0" at 607 is checked. In the case of coincidence failure, by contrast, the receiving process counter zero clear/receiving process i/0 port reset 614 is taken.

The next step to be taken is the checking of the "output pattern=0" at 607. If the output pattern is "0", it means that the checking of the data 5 bits is completed, and it is necessary to set a new data collection pattern for the next frame.

For this purpose, the output pattern initial value set 608 is taken, and a "1" is set as an output pattern. Also, the frame No. updating (+1) 609 is taken. The next step to be taken is the sampling count initial value set 610, followed by the bit counter updating (+2) at 611. Then a jump is made to the position of GFC9 shown in FIG. 32. If the output pattern is not "0", it means that the checking of the data 5 bits is not completed, and it is necessary to check the next input data. For this purpose, the output pattern updating (double) at 640 is taken and the next step to be taken is the sampling count initial value set at 610, followed by the bit counter updating (+2) at 611. Then a jump is made to the position of CFC9 shown in FIG. 32.

The diagram of FIG. 37 shows the manner in which the obstruction limit SW is checked. First, the in-operation flag 615 is checked. Specifically, while the door is in operation, the obstruction SW 616 is checked. If the obstruction SW is on, the status flag set 620 is taken. In the case where the obstruction SW is off, on the other hand, the operating direction limit SW is checked at 617. If it is on, the status flag set 620 is taken. When it is off, on the other hand, the status reset 618 is taken.

In the event that the in-operation flag 615 is off, i.e., the door is stationary, coincidence with the number of steps required for operation is required. Otherwise, the timer must be changed in function between stoppage and operation of the door. Thus the step number coincidence 619 is taken.

An application of the present invention will be described below. According to the foregoing embodiment, for the purpose of time control, part of the temporary memory circuit is used as timing means for timing operation for each predetermined step. This construction is low in cost but not very high in timing accuracy. One method for improving the timing accuracy is to use means for counting the time alone. Specifically, a timing circuit is used which is started by the program memory circuit and in which a specific value is settable. Apart from this, a circuit for generating a timing pulse at predetermined intervals of time may be connected to the input-output circuit, so that each timing pulse input is processed prior to the program in execution.

By doing so, the timing is processed by counting the timing pulses or by use of an input signal of a specific length of timing. This method is generally called an interruption control.

In the aforementioned embodiment, an example of basic mode transfer of the door operating device includes a cycle of upward movement, stop, downward movement and stop. As another application of this invention, however, the example of basic mode transfer as described below may of course be utilized.

In response to each operating input signal, the operation and stop are repeated, and if the door operating device reaches the upper or lower limit position, it is stopped. In response to the next operating input signal, the operating direction is reversed, so that the door is moved in accordance with the command of the operating direction.

In other words, the upward movement and stop are repeated and also, the downward movement and stop are repeated.

In the aforementioned embodiment, the operating input signal is not able to directly designate the direction of door movement. An upward movement command switch and a downward movement command switch may be added to the additional circuit, whereby in response to an input signal to either switch, the door is moved in the direction designated by that switch. This is easily realized only by adding the above-mentioned process to the processing program.

Even according to the embodiment under consideration, it is possible to directly designate the direction of door movement. This is by inserting a switch in parallel to the lower limit switch and the upper limit switch in the circuit to which the outputs from the upper and lower limit switches are applied. In this case, if the upper limit switch is on, the downward movement command is issued, while if the lower limit switch is on, the upward movement command is issued, as easily understood.

In the above-described embodiment, the conditions change after detection of an obstruction in such a manner that the door moving up stops while the door moving down moves up for a predetermined lenght of time after stoppage for a predetermined period of time. According to the present invention, after detection of an obstruction, the process includes a control according to the condition of the door in operation. Specifically, the door is reversed in operation, or the stoppage thereof is eliminated for a predetermined length of time, or the door is moved up not for a predetermined length of time but up to the upper limit point, thus widening the freedom of the condition change processing control.

As another alternative method, during the process after detection of an obstruction, no new operating input signal is accepted, while only after completion of the above-mentioned process, a new operating input signal is accepted.

Still another alternative method is such that regardless of the process being conducted after detection of an obstruction, a new operating input may be accepted.

In the above-mentioned embodiment, the operation time of the door operating device is controlled in such a manner that unless a detection signal of the door operating device is not applied within the operating time, it is judged as abnormal. According to the present invention, due to this operation time control, it is sufficient to provide a condition different from the door in operation. Thus the processes as mentioned below may be taken.

1. The door operating device is stopped.
2. The door operating device is reversed.
3. If the door operating device is in opening operation, it is stopped; while if it is in closing operation, it is reversed to opening operation for a predetermined length of time.
4. If the door operating device is in opening operation, it is stopped; while if it is in closing operation, it is reversed to opening operation.

In the case 2, 3 or 4 above where the door operation is reversed in direction, it may be stopped for a certain period of time.

Still another conceivable method is such that a new operating input signal is not accepted before the above-mentioned process is completed. Notwithstanding, a new operating input signal may be accepted during the same process.

In the above-mentioned embodiment, the direction input from the condition detector is not given priority in the execution processing sequence. Instead, such a condition detector may be given priority in the processing in what is called the interruption control where it is processed prior to the execution program.

Further, a safety device may of course be added or priority may be given to a specific input signal as mentioned above, thereby improving the system performance of the door operating device.

It will thus be understood that according to the present invention the manner of control is set in accordance with the data stored in the program memory circuit which make up a processing program for the door operating device, thereby making possible a versatile control apparatus provided with an additional function only by changing the stored data.

What is claimed is:

1. A door operation control system comprising driving means for driving a door between open and closed positions in response to successively received door operation command signals; first memory circuit means for storing door control data in the form of a combination of command codes, program counter means for designating and updating the addresses of command codes in said first memory circuit means, control means for reading out command codes from said first memory circuit means in accordance with the state of said program counter means, command register means for temporarily storing command codes read out of said first memory circuit means, command decoder means for decoding the command code data stored in said command register means, operational processing circuit means for performing logical operations according to said command codes, second memory circuit means for temporarily storing the operating state and the direction of movement of said door in accordance with the output of said operational processing circuit means, input-output circuit means connected to said command decoder means and responsive to various conditions of said door as indicated by said second memory circuit means and a door operation command signal for controlling said door driving means.

2. A door operation control system according to claim 1, further comprising a radio receiver, said input-output circuit further including code setting means for setting a code specific to said system, means for comparing a received signal from said radio receiver and the code signal from said code setting means, and means for producing a door operation command signal to operate said door when a comparison is detected by said comparing means between said received signal and said code signal.

3. A door operation control system according to claim 2, wherein said received signal has a specific data pattern of a predetermined length at the final part thereof, and wherein said system further comprises means for comparing said specific pattern data with the data stored in said temporary memory circuit.

4. A door operation control system according to claim 2, further comprising counter means controlled by the output of said operational processing circuit means for counting the length of said signal pattern, means responsive to the resulting count in said counter means for calculating the sampling period of the received data following said specific signal pattern in said received signal, means for reading said received data at each said sampling period.

5. A door operation control system according to claim 4, further including means for inhibiting the reading of said received data where the count of said counter means is not included in a predetermined count range.

6. A door operation control system according to claim 4, wherein said received data has a specific pattern signal at intervals of predetermined length, and further including means for correcting the sampling period of said data on the basis of said specific pattern signal.

7. A control system comprising drive means for driving a member between first and second positions, control means for selectively actuating said drive means in first and second directions during which the member is moved from said first position to said second position and from said second position to said first position, respectively; first limit detecting means for generating a first signal upon detection of the member at said first position; and second limit detecting means for generating a second signal upon detection of the member at said second position; said control means including means for controlling the direction of actuation of said drive means in response to generation of said first and second signals, and means for stopping said drive means in response to the simultaneous generation of said first and second signals.

8. A control system as defined in claim 7, wherein said control means further includes memory means for storing an electrical signal representing the previous direction of actuation of said drive means and means for updating said memory means for each actuation of said drive means.

9. A control system as defined in claim 8, further including actuating means for manually actuating said control means, said control means further including means responsive to said actuating means for actuating said drive means in a direction opposite that represented by said electrical signal stored in said memory means.

10. A door operation control system, comprising drive means for driving a door between open and closed positions; first limit detecting means for detecting the presence of the door at said open position; second limit detecting means for detecting the presence of the door at said closed position; and control means for actuating said drive means in first and second directions in accordance with a recurrent operation cycle including movement to drive the door toward said closed position and movement to drive the door toward said open position in response to successively-received input signals, said control means including memory means for storing an indication of the previous direction of movement of the door and actuation means for controlling operation of said drive means on the basis of the data stored in said memory means, the outputs of said first and second limit detecting means and receipt of said input signals.

11. A door operation control system as defined in claim 10, wherein said drive means includes motor means, connecting means for connecting said motor means to said door and means for connecting said motor means to a power source via said control means; said control means including first means responsive to a failure of said power source resulting in an erasing of the data in said memory means for storing data in said memory means at the time power is restored indicating previous down movement of the door so that upon receipt of the next input signal said drive means will be controlled to move the door toward the open position.

12. A door operation control system as defined in claim 11, wherein said control means further includes second means responsive to said first limit detecting means indicating presence of the door at the open position for overriding said first means so that upon receipt of the next input signal after power restoration said drive means will be controlled to move the door toward the closed position in spite of the indication stored in said memory means.

13. A control system comprising drive means for driving a member between first and second positions including motor means and means for connecting said motor means to the member; limit detecting means for detecting the presence of the member at said first position; and control means responsive to successive input signals for actuating said drive means to alternately move said member toward said first position and toward said second position, including means for connecting said motor means to a power source in response to receipt of an input signal and first means responsive to a failure of said power supply for causing the next movement of the member in response to an input signal subsequent to restoration of power to be in a direction toward said first position, and second means responsive to said limit detecting means detecting the member at the first position for overriding said first means so that upon receipt of the next input signal after power restoration said drive means will be controlled to move the member toward said second position, wherein said first means includes memory means for storing data representing the previous direction of movement of the member and the present operating state thereof, said control means including microprocessor means responsive to the data in said memory means and to the receipt of an input signal for controlling the operation of said drive means.

14. A control system comprising drive means for driving a member between first and second positions including motor means and means for connecting said motor means to the member; limit detecting means for detecting the presence of the member at said first position; and control means responsive to successive input signals for actuating said drive means to alternately move said member toward said first position and toward said second position, including means for connecting said motor means to a power source in response to receipt of an input signal and first means responsive to a failure of said power supply for causing the next movement of the member in response to an input signal subsequent to restoration of power to be in a direction toward said first position, and second means responsive to said limit detecting means detecting the member at the first position for overriding said first means so that upon receipt of the next input signal after power restoration said drive means will be controlled to move the member toward said second position, including further limit detecting means for detecting the presence of the member at said second position; said control means further including means responsive to simultaneous actuation of both of said limit detecting means for inhibiting further operation of said drive means.

15. A control system comprising drive means for driving a member between first and second positions; control means for selectively connecting said drive means to a source of electrical power to effect operation thereof; limit detector means responsive to arrival of the member at said second position for applying a signal to said control means to effect deactivation of said drive means; and timing means responsive to the start of operation of said drive means to move the member from said first position to said second position for controlling said control means to effect deactivation of said drive means after a predetermined period of time subsequent to said start, wherein said control means includes reversing means responsive to said timing means for deactivating said drive means and then controlling said drive means to drive the member in a direction from said second position toward said first position.

16. A control system comprising drive means for driving a member between first and second positions; control means for selectively connecting said drive means to a source of electrical power to effect operation thereof; limit detector means responsive to arrival of the member at said second position for applying a signal to said control means to effect deactivation of said drive means; and timing means responsive to the start of operation of said drive means to move the member from said first position to said second position for controlling said control means to effect deactivation of said drive means after a predetermined period of time subsequent to said start, further including obstruction detection means for detecting interception of the member by an obstruction between said first and second positions, said control means including reversing means responsive to said obstruction detection means for deactivating said drive means and then controlling said drive means to reverse the movement of the member in a direction opposite that in which it was moving at the time of interception, wherein said reversing means includes means responsive to said timing means for controlling said drive means to drive the member in a direction from said second position to said first position subsequent to expiration of said predetermined period of time in the absence of a signal from said obstruction detection means or said limit detector means.

17. A system for controlling a motor to move an article between first and second positions, comprising an electrical motor; means for connecting said motor to the article; controllable means for selectively operating said motor in forward and reverse directions to move the article between said first and second positions; detection means responsive to arrival of said article at said second position for controlling said controllable means to stop the operation of said motor causing movement of the article to said second position; timing means for controlling said controllable means to stop the operation of said motor a first predetermined time after start of operation thereof in the absence of a signal from said detection means, said first predetermined time exceeding the length of time required for said article to be moved normally between said first and second positions, means for manually initiating the generation of input signals for controlling said controllable means to alternately generate stop and start signals to cyclically operate said motor in said forward and reverse directions; and wherein said controllable means further includes timing means responsive to detection of a trailing edge of an input signal for inhibiting any change in the operation condition of said motor for a second predetermined period of time, said timing means including means for preventing generation of a start signal for a third predetermined period of time subsequent to the detection of a trailing edge of an input signal.

18. A system as defined in claim 17, wherein said controllable means further includes counter means for counting those start signals which are generated during a fourth predetermined period of time subsequent to generation of a stop signal, inhibiting means for inhibiting response by said controllable means to receipt of input signals for a fifth predetermined period of time subsequent to said counter means reading a predetermined count, and means for resetting said counter means when no input signal has been received by said controllable means for a sixth period of time.

19. A system as defined in claim 17, wherein said controllable means includes timing means responsive to generation of a predetermined number of start signals within a fourth predetermined period of time for inhibiting generation of further start signals for a fifth predetermined period of time.

20. A system as defined in claim 17, wherein said controllable means further includes counter means for counting said input signals, timing means for measuring a fourth predetermined period of time and means responsive to said counter means and said timing means for inhibiting generation of further start signals for a fifth predetermined period of time when said counter means reaches a predetermined count during said fourth predetermined period of time.

21. A door operation control system comprising drive means for driving a door between first and second positions; control means for actuating said drive means in first and second directions and for stopping said drive means in response to successively-received input signals so that said drive means operates in said first direction, stops, operates in said second direction and stops in a recurrent manner with receipt of said input signals; means for manually initiating the generation of said input signals; and timing means for prohibiting actuation of said drive means in response to an input signal for a first predetermined time subsequent to the stopping thereof, wherein said control means includes means responsive to said input signals for actuating said drive means, and wherein said timing means includes means responsive to detection of a trailing edge of an input signal for inhibiting said control means from altering operation of said actuating means in response to a succeeding input signal generating during a second predetermined period of time after detection of said trailing edge.

22. A door operation control system as defined in claim 21, wherein said second predetermined period of time is approximately 0.25 second.

23. A door operation control system as defined in claim 21 or claim 22, wherein said first predetermined period of time is 0.50 second.

24. A door operation control system as defined in claim 21, wherein said timing means includes a counter and means for controlling said counter to measure said first and second predetermined periods of time in response to detection of the trailing edge of an input signal.

25. A door operation control system as defined in claim 24, wherein said control means further includes means responsive to detection of a leading edge of a current input signal and a state of said counter indicating that said second predetermined period of time has not expired since detection of the trailing edge of the previous input signal for recognizing the current input signal as a continuation of the previous input signal.

26. A door operation control system as defined in claim 24, wherein said control means further includes means responsive to detection of a leading edge of a current input signal at a time when the drive means is not operating and a state of said counter indicating that a period of time has expired which is greater than said second predetermined period of time but less than said first predetermined period of time for inhibiting operation of said drive means in response to said current input signal.

27. A control system comprising drive means for driving a member between first and second positions; means for manually initiating the generation of input signals to initiate successive operations of the member in a recurrent cycle including movement of the member toward said first position, stopping, movement of the member toward said second position and stopping in that order; and control means responsive to receipt of successive input signals for controlling said drive means in accordance with the operations of said recurrent cycle, including counter means for counting said input signals, timing means including a timer for measuring a first predetermined period of time and means responsive to said counter means and said timing means for inhibiting operation of said drive means for a second predetermined period of time when said counter means reaches a predetermined count within said first predetermined period of time.

28. A control system as defined in claim 27, wherein said control means further includes means for resetting said counter and said timer at the end of said first predetermined period of time if said counter means has not reached said predetermined count, and means for actuating said timer upon receipt of a first input signal subsequent to said resetting.

29. A motor control system as defined in claim 28, wherein said timing means includes a second timer for measuring said second predetermined period of time in response to said counter means reaching said predetermined count and means for resetting said counter means, said first-mentioned timer and said second timer at the end of said second predetermined period of time after said counter has reached said predetermined count.

30. A control system as defined in claim 29, wherein said second predetermined period of time is not greater than said first predetermined period of time.

31. A motor control system, comprising drive means for driving a member between first and second positions including a motor and means for connecting said motor in driving relationship to said motor; control means for selectively operating said motor; and means responsive to operation of said motor a predetermined number of times within a first predetermined period of time for inhibiting further operation of said motor for a second predetermined period of time.

32. A motor control system, comprising drive means for driving a member between first and second positions including a motor and means for connecting said motor in driving relationship to said member; means for manually initiating the generation of input signals; and control means for alternately generating start and stop signals for controlling said drive means in response to receipt of successive input signals, including timing means responsive to generation of a predetermined number of start signals within a first predetermined period of time for inhibiting further operation of said motor for a second predetermined period of time.

33. A motor control system as defined in claim 32, wherein said timing means includes counter means for counting said start signals, first means for measuring said first predetermined period of time, second means for resetting said counter means and said first means when said first means has measured said first predetermined period of time if said counter means has not reached said predetermined count, and third means for actuating said first means in response to the first start signal generated subsequent to said resetting.

34. A motor control system as defined in claim 33, wherein said timing means further includes fourth means for measuring a third predetermined period of time subsequent to generation of each stop signal and fifth means responsive to said fourth means for enabling said counter means to count only those start signals which are generated during said third predetermined period of time subsequent to generation of each stop signal, where said third predetermined period of time is shorter than said first predetermined period of time.

35. A motor control system as defined in claims 33 or 34, wherein said timing means includes sixth means for resetting said counter means and said first means when no start signal is generated within a fourth predetermined period of time.

36. A motor control system, comprising drive means for driving a member between first and second positions including a motor and means for connecting said motor in driving relationship to said member; means for manually initiating the generation of input signals; and control means responsive to said input signals for alternately generating start and stop signals for controlling said drive means, including counter means for counting those start signals which are generated during a first predetermined period of time subsequent to generation of a stop signal, inhibiting means for inhibiting response by said control means to receipt of input signals for a second predetermined period of time subsequent to said counter means reaching a predetermined count, and means for resetting said counter means when no input signal has been received by said control means for a third predetermined period of time.

37. A motor control system as defined in claim 36, wherein said control means further includes timing means responsive to detection of a trailing edge of an input signal for preventing any change in the operating condition of said drive means for a fourth predetermined period of time.

38. A motor control system as defined in claim 37, wherein said timing means includes means for preventing generation of a start signal for a fifth predetermined period of time subsequent to detection of the trailing edge of an input signal.

39. A motor control system as defined in claims 36 or 38, further including limit detector means responsive to arrival of said member at said second position for effecting the generation of a stop signal by said control means to be applied to said drive means; and wherein said control means further includes means responsive to generation of a start signal for effecting generation of a stop signal after a sixth predetermined period of time.

40. A motor control system, comprising drive means for driving a member between first and second positions including a motor and means for connecting said motor in driving relationship to said member; means for manually initiating the generation of input signals; and control means responsive to said input signals for alternately generating stop and start signals for controlling said drive means, including counter means for counting start signals, inhibiting means for inhibiting response by said control means to receipt of input signals for a first predetermined period of time subsequent to said counter reaching a predetermined count, and means for resetting said counter means when no input signal has been received by said control means for a second predetermined period of time.

41. A system for controlling a motor to move an article between first and second positions, comprising an electrical motor; means for connecting said motor in operational relationship with said article; controllable means for selectively operating said motor in forward and reverse directions to move the article between said first and second positions in response to successivelyreceived input signals; means for manually initiating the generation of said input signals; and obstruction detection means for detecting interception of said article by an obstruction between said first and second positions; said controllable means including first means responsive to said obstruction detection means for controlling said drive means to stop said motor and thereafter to reverse the direction of operation thereof so as to reverse the movement of said article, further including second means for detecting the presence of said article within a predetermined distance of said second position, said first means including third means responsive to said obstruction detection means and said second means for stopping said motor without thereafter reversing the direction thereof when said article is within said predetermined distance at said second position.

42. A system for controlling a motor to move an article between first and second positions, comprising an electrical motor; means for connecting said motor in operational relationship with said article; controllable means for selectively operating said motor in forward and reverse directions to move the article between said first and second positions in response to successively-received input signals; means for manually initiating the generation of said input signals; and obstruction detection means for detecting interception of said article by an obstruction between said first and second positions; said controllable means including first means responsive to said obstruction detection means for controlling said drive means to stop said motor and thereafter to reverse the direction of operation thereof so as to reverse the movement of said article, wherein said first means includes means for limiting the reverse movement of said drive means after stopping to a time period which will result in limited reverse movement of said article.

43. A system for controlling a motor as defined in claim 42, wherein said limited reverse movement of said article is no greater than one foot.

44. A system for controlling a motor to move an article between first and second positions, comprising an electrical motor; means for connecting said motor in operational relationship with said article; controllable means for selectively operating said motor in forward and reverse directions to move the article between said first and second positions in response to successively-received input signals; means for manually initiating the generation of said input signals; and obstruction detection means for detecting interception of said article by an obstruction between said first and second positions; said controllable means including first means responsive to said obstruction detection means for controlling said drive means to stop said motor and thereafter to reverse the direction of operation thereof so as to reverse the movement of said article, further including limit detecting means responsive to the presence of said article at said first or said second position for controlling said controllable means to stop said motor; said controllable means including means responsive to said limit detecting means for overriding said first means.

45. A control system comprising drive means for driving a member between first and second positions; first means for detecting the presence of said member at said first and second positions; second means for detecting the movement of said member between said first and second positions; an indicator located remote from said member and capable of steady-state and intermittent operation; and third means responsive to said first and second means for operating said indicator in the steady state when said member is at said first position, for operating said indicator intermittently when said member is moving between said first and second positions and for deactivating said indicator when said member is at said second position.

46. A control system as defined in claim 45, further including stop control means for selectively stopping said drive means at said first or said second positions or selective positions therebetween.

47. A control system as defined in claim 46, wherein said second means includes memory means for storing data representing the present operating state of said drive means.

48. A control system as defined in claim 47, further including fourth means responsive to said first and second means for controlling said third means to operate said indicator in the steady state when said member is stopped at a position between said first and second positions.

49. A control system as defined in claim 48, wherein said motor is a door.

50. A door operation control system, comprising drive means for driving a door between open and closed positions; limit detector means for detecting the presence of the door at said open and closed positions; door control means responsive to selectively-generated input signals for actuating said drive means to move the door between said open and closed positions and to stop the door at selected positions therebetween, including means responsive to said limit detector means for stopping the door at the open and closed positions; an indicator located at a position remote from said door at which said door is not visible; and indicator control means responsive to said limit detector means and said door control means for operating said indicator in the steady state when the door is stopped at any position except said closed position, for operating said indicator intermittently when said door is moving between said first and second positions, and for deactivating said indicator when said door is at said closed position.

51. A door operation control system as defined in claim 50, wherein said door control means includes memory means for storing data representing the present operating state of said drive means.

52. A door operation control system as defined in claim 50, wherein said indicator control means is a microprocessor.

53. In a system for controlling the movement of a driven member by a motor between a first position and a second position including first and second sensor means for indicating when said element has reached said first or said second position, respectively, and switch means for effecting selective operation of said member, the improvement comprising:

memory means for temporarily storing a history and direction of movement of said motor driven member; and motor control means connected to said memory means for controlling the operation of said motor in response to signals from said switch means and said memory means.

54. The improved system of claim 53, further including second memory means for storing motor control data as command codes, counter means for designating sequential addresses of said command codes in said second memory means, and command code storage means for storing command codes read out of said second memory means.

55. The improved system of claim 54, wherein said motor control means includes operational processing means for performing calculations on said command codes and timing control means for controlling the timing of said counter means and said operational processor means wherein command codes are sequentially read from said second memory means in order to sequentially control said motor.

56. The improved system of claim 55, wherein said motor control means includes means for updating the data in said firstmentioned memory means in order to provide a history and direction of movement of said motor driven member in response to each input signal from said switch means by indicating a desired operation of said member such that the member when in operation is stopped in response to an input signal from said switch means and the member when in a stationary state is urged in the direction reverse to the immediately-proceeding direction in response to an input signal from said switch means.

57. The motor controlling system of claim 53, further including third sensor means for indicating excessive resistance to movement of said member between said first and second position and continuation timer means actuated by an output signal from said second sensor means to drive said motor only for a predetermined length of time.

58. The control system of claim 57, including motor stop means responsive to said third sensor means and said timer means to stop said motor when an excessive resistance to movement of said member occurs while said timing means is actuated.

59. The system of claim 53, wherein said motor control means is responsive to an output signal from said first sensor means and said switch means to actuate said motor whereby said member is driven in a direction from said first to said second position.

60. The control system of claim 53 or 59, wherein said motor control means is responsive to an output signal from said second sensor means and said switch means to actuate said motor to drive said member in a direction from said second position to said first position.

61. The motor control system of claim 53 or 59 further comprising switch inhibit signal means responsive to simultaneous input signal from said first and said second sensor means, and wherein said motor control means includes means responsive to said simultaneous first and second sensor signals to stop said motor operation.

62. In a system for controlling an element driven by a motor between a first position and a second position having respective first and second sensing means for detecting presence of said element, obstruction detection means for indicating excessive resistance to movement of said element between said positions and input switch means for effective selective motor operation, the improvement comprising:

timer means for setting a predetermined timing period and actuated by the turning on of said motor, said timer means output being fed to said motor to interrupt the direction of movement of said motor driven element after the expiration of said timing period regardless of the condition of said first and second sensing means and said obstruction detection means, wherein said timer means includes means for reversing the direction of said movement for a predetermined distance and then stopping the movement of said element when the original movement of said element was in a direction from said first position to said second position.

63. The system of claim 62, wherein said timer means includes means for effecting stoppage of said element when the direction of movement of said element is between said second position and said first position.

64. In a system for controlling a motor driven element between a first position and a second position having respective first and second sensor means, and switch means for outputting signals to effect a desired operation to include starting and stopping of said motor driven element, the improvement comprising:

first timer means initiated when said motor driven element has stopped;

control means including a first counter for counting the number of start signals from said switch means during a predetermined time set on said first timer means;

second timer means set at a second predetermined value and initiated when a start operating command is received from said switch means whereby said second timer means resets said counter means after the expiration of said second predetermined time period if no start operating signal is received from said switch means; and switch command signal inhibiting means initiated by said counter reaching a predetermined value whereby said switch inhibiting means is effective for a third predetermined time after said counter reaches said predetermined value.

65. In a system for controlling the movement of a motor driven member between a first position and a second position including first and second sensor means for indicating when said element has reached said first or said second position, respectively, third sensor means for indicating excessive resistance to movement between said positions and input switch means to indicate desired motor operation of said member, the improvement comprising:

direction indicating means responsive to the movement of said motor driven member to indicate the direction of movement of said member; and motor control means responsive to said third sensor means and said direction indicating means to control the condition of said motor driven member during movement thereof, including timing means activated by an output signal from said third sensor means and an output from said direction indicator means which indicates that said member is traveling from said first position to said second position and means for reversing the direction of movement of said motor driven element for said predetermined time set by said timing means whereby upon the expiration of said predetermined period of time said motor driven element is stopped.

66. The system of claim 65, wherein said motor control means includes means for stopping said motor driven member when said third sensor means outputs a signal and simultaneously when said direction indicator means indicates that said motor driven element is traveling from said second position to said first position.

67. The system of claim 65, further comprising switch inhibiting means for inhibiting said switch means input signal during the activation of said timer means.

68. A control system comprising drive means for driving a member between first and second positions; control means for selectively connecting said drive means to a source of electrical power to effect operation thereof; limit detector means responsive to arrival of the member at said second position for applying a signal to said control means to effect deactivation of said drive means; and timing means responsive to the start of operation of said drive means to move the member in a direction from said first position to said second position for controlling said control means to activate said drive means to drive the member in a direction from said second positon toward said first position after a predetermined period of time subsequent to said start in the absence of an electrical signal from said limit detector means.

69. A control system as defined in claim 68, wherein said timing means includes means to control said control means to deactivate said drive means and then to activate said drive means to drive the member in a direction from said second position toward said first position subsequent to expiration of said predetermined period of time.

70. A control system as defined in claim 68, further including means for manually initiating the generation of an input signal, said control means being responsive to said input signal from said manual input signal generation means to effect alternate activation and deactivation of said drive means, and said timing means controlling said control means to activate said drive means to drive the member in a direction from said second position toward said first position subsequent to expiration of said predetermined period of time in the absence of an electrical signal from said limit detector means or said manual input signal generation means.

71. A control system as defined in claim 70, said control means including means for ignoring said input signal from said manual input signal generation means during the driving of the member in a direction from said second position toward said first position subsequent to expiration of said predetermined period of time.

72. A control system as defined in claim 70, wherein said control means is responsive to a leading edge of said input signal except during a predetermined period of time subsequent to a trailing edge of the input signal to which said control means has been responsive.

73. A control system as defined in claim 68, 69, 70, 71 or 72, further including obstruction detection means for detecting interception of the member by an obstruction between said first and second positions, said control means being responsive to said obstruction detection means to activate said drive means to drive the member in a direction from said second position toward said first position, and said timing means controlling said control means to activate said drive means to drive the member in said direction subsequent to expiration of said predetermined period of time in the absence of said electrical signal and an electrical signal from said obstruction detection means.

74. A control system as defined in claim 68, 69, 70, 71 or 72, further including other limit detection means responsive to arrival of the member at said first position for applying a signal to said control means to effect deactivation of said drive means, said timing means including means for controlling said control means to effect deactivation of said drive means at the expiration of said predetermined period of time in the absence of an electrical signal from said other limit detection means.

75. A control system as defined in claim 74, further including obstruction detection means for detecting interception of the member by an obstruction between said first and second positions, said drive means being deactivated responsive to said obstruction detection means while the member moves in a direction from said second position to said first position.

76. A control system as defined in claim 74, said control means including means for stopping the movement of the member when the member has been moved by a predetermined distance from a position at which the direction of movement of the member is reversed from in a direction toward said second position to a direction toward said first position.

77. A control system as defined in claim 74, said control means including means for stopping the movement of the member when the member has been moved by a predetermined time from a time at which the direction of movement of the member is reversed from a direction toward said second position to a direction toward said first position.

78. A control system as defined in claim 68, 69, 70, 71 or 72, said control means including means for stopping the movement of the member when the member has been moved by a predetermined distance from a position at which the direction of movement of the member is reversed from a direction toward said second position to a direction toward said first position.

79. A control system as defined in claim 68, 69, 70, 71 or 72, said control means including means for stopping the movement of the member when the member has been moved by a predetermined time from a time at which the direction of movement of the member is reversed from a direction toward said second position to a direction toward said first position.

80. A door control system comprising drive means for driving a door between upper and lower positions; control means for selectively connecting said drive means to a source of electrical power to effect operation thereof; manual input means for initiating the generation of a manual input signal to control said control means; upper position detector means responsive to arrival of the door at said upper position for generating an upper position signal; lower position detector means responsive to arrival of the door at said lower position for generating a lower position signal; obstruction detection means for detecting interception of the door by an obstruction between said upper and lower positions to generate an obstruction signal; timing means responsive to the start of operation of said drive means for generating a timing signal after a predetermined period of time subsequent to said start in the absence of said manual input signal, said lower position signal, said upper position signal and said obstruction signal; wherein said control means controls said drive means in a manner that:

(a) the door is moved in a direction from said lower position toward said upper position when the generation of one of said obstruction signal and said timing signal occurs during operation to move the door in a direction from said upper position toward said lower position;
(b) the operation to move the door is stopped when the generation of one of said obstruction signal and said timing signal occurs during operation to move the door in a direction from said lower position toward said upper position.

* * * * *

UNITED STATES PATENT AND TRADEMARK OFFICE

CERTIFICATE OF CORRECTION

PATENT NO. : 4,328,540

DATED : May 4, 1982

INVENTOR(S) : Shigeru Matsuoka et al.

It is certified that error appears in the above—identified patent and that said Letters Patent is hereby corrected as shown below:

On the title page, Insert Foreign Priority Data

| | | | |
|---|---|---|---|
| -- (30) | Feb. 23, 1979 | Japan | 54-21066 |
| | Feb. 23, 1979 | Japan | 54-21067 |
| | Feb. 23, 1979 | Japan | 54-21068 -- |

Signed and Sealed this

*Ninth* Day of *November 1982*

[SEAL]

*Attest:*

GERALD J. MOSSINGHOFF

*Attesting Officer* *Commissioner of Patents and Trademarks*